US010157315B2

(12) United States Patent
Nobori et al.

(10) Patent No.: US 10,157,315 B2
(45) Date of Patent: Dec. 18, 2018

(54) IMAGE CAPTURING APPARATUS, MONITORING SYSTEM, IMAGE PROCESSING APPARATUS, IMAGE CAPTURING METHOD, AND NON-TRANSITORY COMPUTER READABLE RECORDING MEDIUM

(71) Applicant: Panasonic Intellectual Property Management Co., Ltd., Osaka (JP)

(72) Inventors: Kunio Nobori, Osaka (JP); Satoshi Sato, Kyoto (JP); Takeo Azuma, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 355 days.

(21) Appl. No.: 14/555,643

(22) Filed: Nov. 27, 2014

(65) Prior Publication Data
US 2015/0172633 A1 Jun. 18, 2015

(30) Foreign Application Priority Data

Dec. 13, 2013 (JP) ................................. 2013-258380

(51) Int. Cl.
*G06K 9/00* (2006.01)
*H04N 5/232* (2006.01)
(Continued)

(52) U.S. Cl.
CPC ..... *G06K 9/00664* (2013.01); *G06K 9/00805* (2013.01); *G06T 7/596* (2017.01);
(Continued)

(58) Field of Classification Search
CPC .............. H04N 5/23238; G06T 7/0077; G06K 9/00664; G06K 9/00805
(Continued)

(56) References Cited

U.S. PATENT DOCUMENTS 5,475,422 A * 12/1995 Mori ...................... G06K 9/209
348/48
7,899,321 B2 * 3/2011 Cameron ............... G03B 35/00
348/345
(Continued)

FOREIGN PATENT DOCUMENTS

JP    6-167564      6/1994
JP    2001-285692   10/2001
JP    2007-024647   2/2007

OTHER PUBLICATIONS

C. Zach et al., "A duality based approach for realtime TV-L1 optical flow," In Proceedings of the 29th DAGM conference on Pattern recognition, pp. 214-223, 2007.
(Continued)

*Primary Examiner* — Thai Q Tran
*Assistant Examiner* — Jose M Mesa
(74) *Attorney, Agent, or Firm* — Wenderoth, Lind & Ponack, L.L.P.

(57) ABSTRACT

There is provided an image capturing apparatus that captures a plurality of images, calculates a three-dimensional position from the plurality of images, and outputs the plurality of images and information about the three-dimensional position. The image capturing apparatus includes an image capturing unit, a camera parameter storage unit, a position calculation unit, a position selection unit, and an image complementing unit. The image capturing unit outputs the plurality of images using at least three cameras. The camera parameter storage unit stores in advance camera parameters including occlusion information. The position calculation unit calculates three dimensional positions of a plurality of points. The position selection unit selects a piece of position information relating to a subject area that does not have an occlusion, and outputs selected position information. The image complementing unit generates a complementary
(Continued)

image, and outputs the complementary image and the selected position information.

13 Claims, 16 Drawing Sheets

(51) Int. Cl.
    *G06T 7/593*     (2017.01)
    *H04N 13/243*     (2018.01)

(52) U.S. Cl.
    CPC ............... *H04N 5/23238* (2013.01); *G06T 2207/10012* (2013.01); *G06T 2207/10052* (2013.01); *G06T 2207/30261* (2013.01); *H04N 13/243* (2018.05); *Y10S 901/01* (2013.01); *Y10S 901/47* (2013.01)

(58) Field of Classification Search
    USPC .......................................................... 348/36
    See application file for complete search history.

(56) References Cited

U.S. PATENT DOCUMENTS

| | | | |
|---|---|---|---|
| 8,160,391 B1* | 4/2012 | Zhu | G06T 3/4038 345/629 |
| 2003/0012409 A1* | 1/2003 | Overton | G06T 7/60 382/103 |
| 2007/0057816 A1* | 3/2007 | Sakakibara | B62D 15/0275 340/932.2 |
| 2011/0080487 A1 | 4/2011 | Venkataraman et al. | |
| 2012/0154548 A1 | 6/2012 | Zargarpour et al. | |
| 2014/0104378 A1* | 4/2014 | Kauff | H04N 5/247 348/38 |

OTHER PUBLICATIONS

M. Werlberger et al., "Motion estimation with non-local total variation regularization," IEEE Conference on Computer Vision and Pattern Recognition (CVPR), pp. 2464-2471, Jun. 13-18, 2010.
The Extended European Search Report dated Apr. 20, 2015 for the related European Patent Application No. 14194439.7.
Vincent Chapdelaine-Couture et al: "The omnipolar camera: A new approach to stereo immersive capture", Computational Photography (ICCP), 2013 IEEE International Conference on, IEEE, Apr. 19, 2013 (Apr. 19, 2013), pp. 1-9, XP032424259.
Tanahashi H et al: "Generation of spherical image mosaic using 3D information obtained from stereo omni-directional system (SOS)", Proceedings of the Fifth Asian Conference on Computer Vision : Jan. 22-25, 2002, Melbourne, Australia, Caulfield East, Victoria, AU, vol. 2, Jan. 1, 2002 (Jan. 1, 2002), pp. 574-579, XP009155443.
The Communication pursuant to Article 94(3) EPC dated Dec. 11, 2017 for the related European Patent Application No. 14 194 439.7.
Xiao Xiao et al., "Capture of Vehicle Surroundings Using a Pair of Panoramic Annular Lens Cameras", Telecommunications, 2007. ITST'07. 7th International Conference on Its, IEEE, Piscataway, NJ, USA, Jun. 1, 2007 (Jun. 1, 2007), pp. 1-5, XP031130357.
Leanne Matuszyk et al., "Stereo Panoramic Vision for Monitoring Vehicle Blind-Spots", Intelligent Vehicles Symposium, 2004 IEEE Parma, Italy Jun. 14-17, 2004, Piscataway, NJ, USA, IEEE, Jun. 14, 2004 (Jun. 14, 2004), pp. 31-36, XP010727438.

* cited by examiner

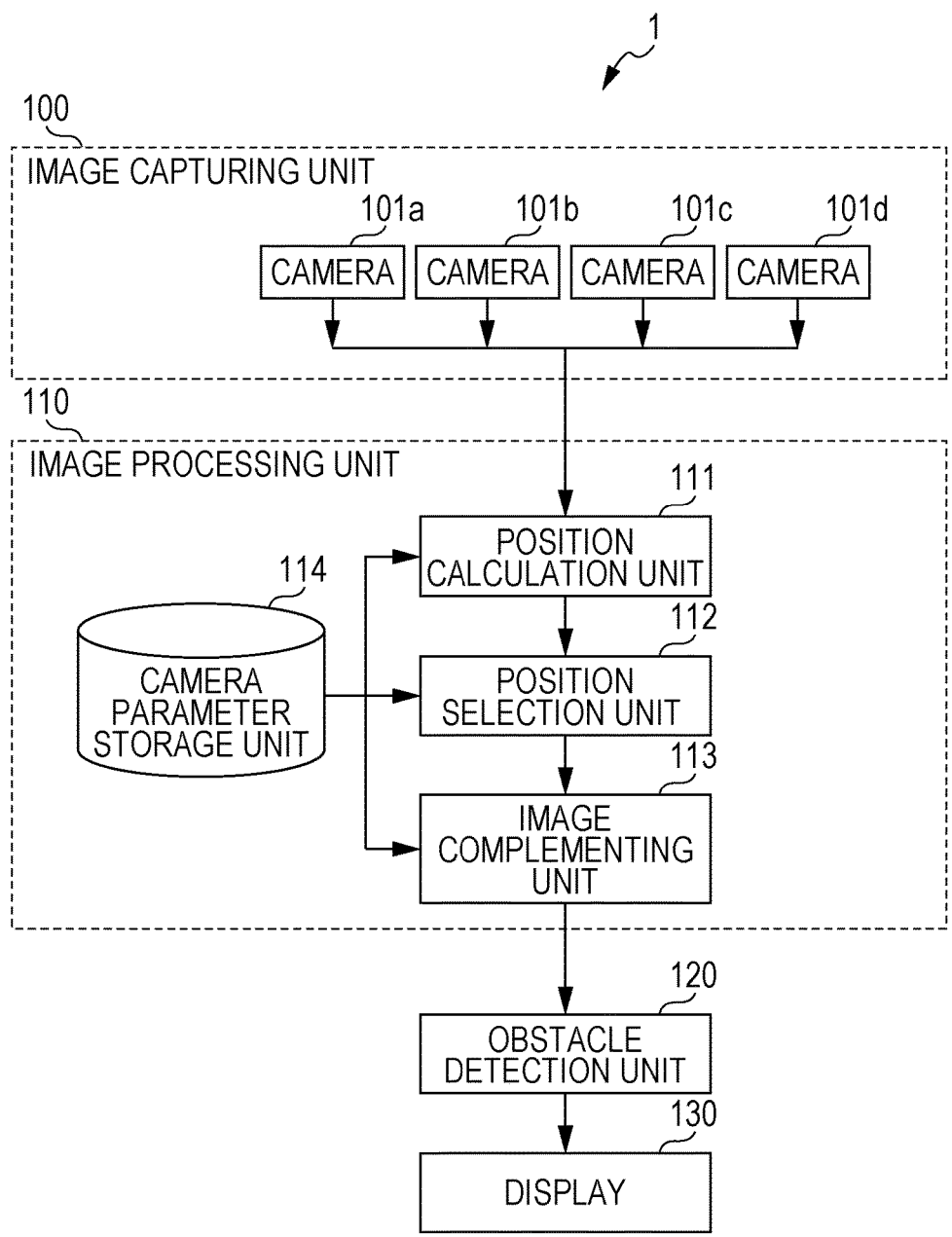

FRONT VIEW   SIDE VIEW   CROSS-SECTIONAL VIEW

FRONT VIEW   SIDE VIEW

FIG. 6A
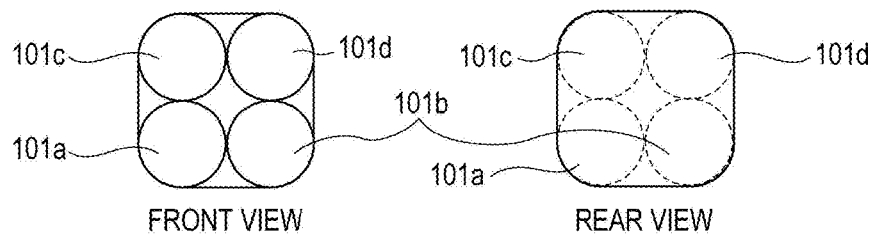
FRONT VIEW     REAR VIEW
FIG. 6B
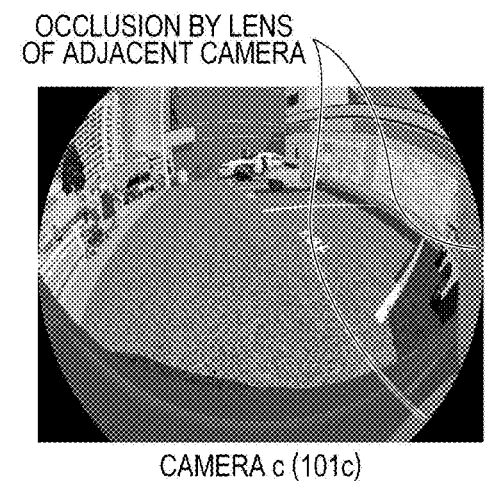
CAMERA c (101c)
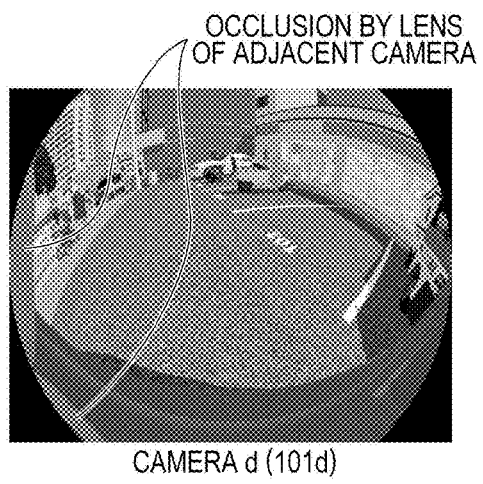
CAMERA d (101d)
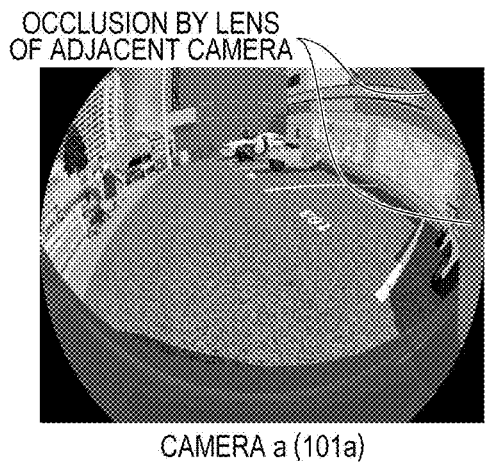
CAMERA a (101a)
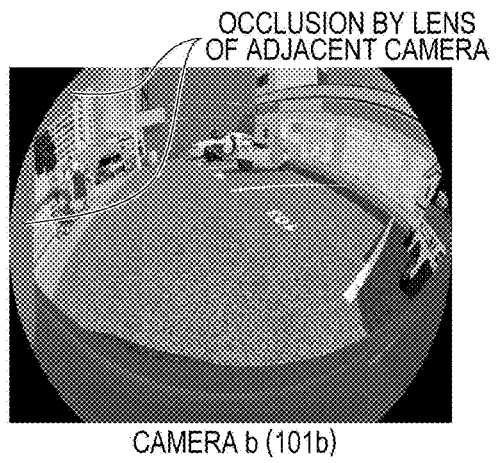
CAMERA b (101b)

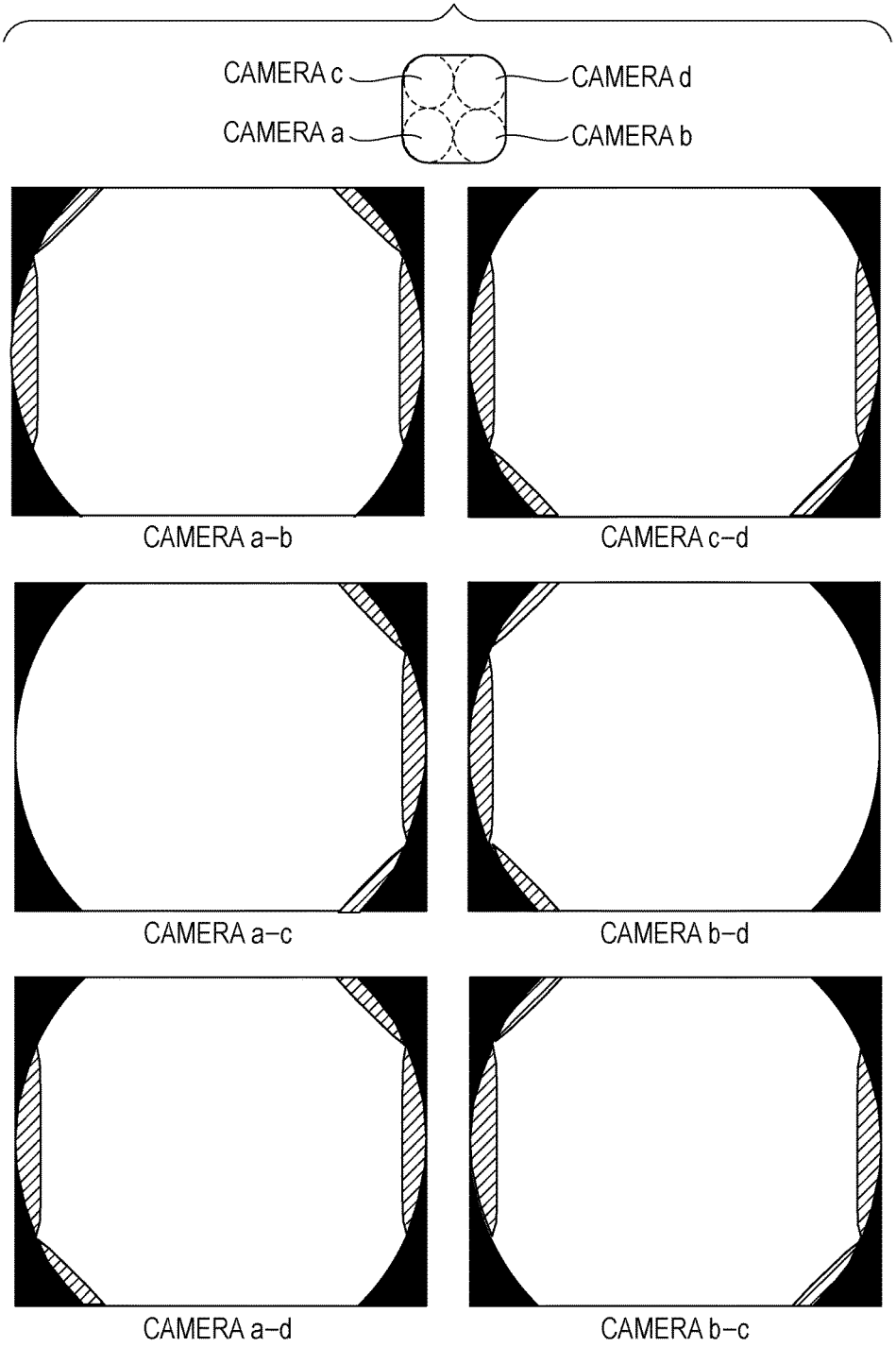

FIG. 12
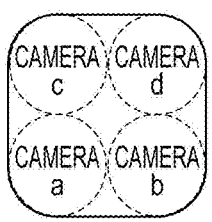
REAR VIEW
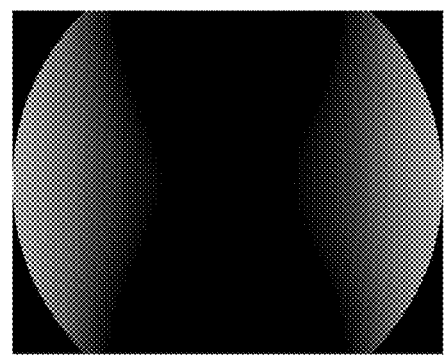
CAMERA a-b, c-d
CAMERA a-c, b-d
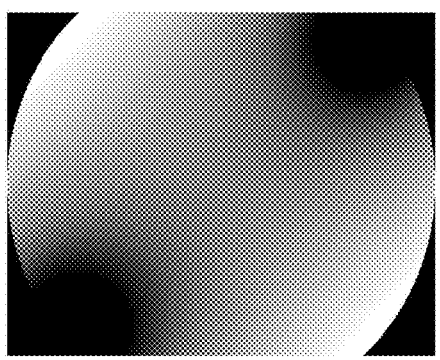 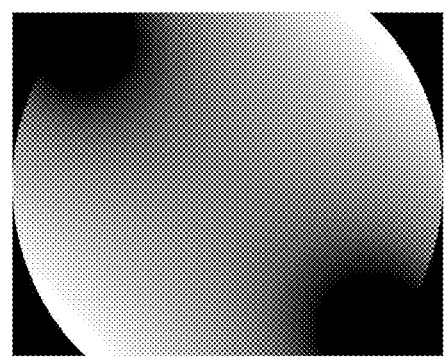
CAMERA a-d
CAMERA b-c

IMAGE CAPTURING APPARATUS, MONITORING SYSTEM, IMAGE PROCESSING APPARATUS, IMAGE CAPTURING METHOD, AND NON-TRANSITORY COMPUTER READABLE RECORDING MEDIUM

CROSS REFERENCE TO RELATED APPLICATION

The present application claims the benefit of Japanese Patent Application No. 2013-258380 filed on Dec. 13, 2013. The entire disclosure of the above-identified application, including the specification, drawings and claims, is incorporated herein by reference in its entirety.

BACKGROUND

1. Technical Field

The present disclosure relates to a technique for capturing wide-angle images and obtaining a three-dimensional position in the field of view.

2. Description of the Related Art

A method of determining the position of a target object using a plurality of image capturing apparatuses having fish-eye lenses is known (see Japanese Unexamined Patent Application Publication No. 6-167564).

According to the related art described above, in an image capturing apparatus including a plurality of cameras having fish-eye lenses, an image captured by a camera among the plurality of cameras may include an area in which the other cameras among the plurality of cameras are visible. That is, in an image captured by a camera, an object, for example, which is located behind the other cameras, is not visible because the object is occluded, and therefore, an image and the three-dimensional position of the object cannot be obtained.

SUMMARY

One non-limiting and exemplary embodiment provides an image capturing apparatus capable of obtaining an image that does not include an area in which a camera included in the image capturing apparatus is visible and capable of obtaining a three-dimensional position.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same. In one general aspect, the techniques disclosed here feature: an image capturing apparatus that captures a plurality of images, calculates a three-dimensional position from the plurality of images that have been obtained, and outputs the plurality of images and information about the three-dimensional position, the image capturing apparatus including an image capturing unit, a camera parameter storage unit, a position calculation unit, a position selection unit, and an image complementing unit. The image capturing unit is configured to generate and output the plurality of images by performing image capturing using at least three cameras, the cameras being arranged such that optical axes thereof are substantially parallel to one another and the cameras are close to one another. The camera parameter storage unit is configured to store in advance camera parameters including external parameters regarding physical arrangement of the cameras, internal parameters regarding characteristics of the cameras, and occlusion information that includes information indicating whether or not an area in an image captured by each of the cameras is an area occluded by the other cameras. The position calculation unit is configured to receive the plurality of images and the camera parameters, and to calculate three dimensional positions of a plurality of points from two or more sets of images formed by using the plurality of images and the camera parameters. The position selection unit is configured to receive pieces of position information about the plurality of points that have been calculated by the position calculation unit and the occlusion information stored in the camera parameter storage unit, to select a piece of position information relating to a subject area that does not have an occlusion from among the pieces of position information about the plurality of points, and to output the selected piece of position information as selected position information. The image complementing unit is configured to receive the plurality of images and the selected position information, to generate a complementary image on the basis of the selected position information by complementing an occluded area that is present in one of the plurality of images using the other images, and to output the complementary image and the selected position information.

Note that general and specific aspects of the present disclosure may be implemented in the form of a system, a method, an integrated circuit, a computer program, or a computer readable recording medium, such as a compact disk read-only memory (CD-ROM), or may be implemented using any combination of a system, a method, an integrated circuit, a computer program, and a computer readable recording medium.

The image capturing apparatus according to one aspect of the present disclosure is able to obtain an image that does not include an area in which a camera included in the image capturing apparatus is visible and to obtain a three-dimensional position.

BRIEF DESCRIPTION OF THE DRAWINGS

FIG. 1A is a block diagram illustrating a configuration of an image capturing apparatus according to a first embodiment.

FIG. 6A is a schematic diagram illustrating an example of camera arrangement, and FIG. 6B illustrates examples of captured images in the first exemplary embodiment of the present disclosure.

FIG. 8 includes schematic diagrams illustrating examples of occlusion areas in position information in the first embodiment.

FIG. 12 includes examples of disparities between images captured by four cameras while taking into consideration occlusion in the first embodiment.

DETAILED DESCRIPTION

Underlying Knowledge

In order for a user or a system to perform determination or control in a safe driving assistance system for vehicles, a remote operation system for mobile robots, or a monitoring camera system that detects suspicious individuals, for example, an image of an area around the system and information about the three-dimensional position of a monitor target are required. In particular, in the case where a monitor target, such as a person or a vehicle, is moving or a system, such as a vehicle or a robot, itself is moving, it is important to obtain a wider-angle image and the three-dimensional position of the monitor target, for example.

As a method of obtaining an image and the three-dimensional position of a monitor target, for example, binocular stereo vision is generally used. In binocular stereo vision, two cameras are arranged at different viewpoints such that their fields of view overlap, two images are obtained, corresponding points in the two images are calculated, and the three-dimensional position of the corresponding points is calculated using the corresponding points and information about the positions and orientations of the cameras which has been obtained in advance.

In binocular stereo vision, on a straight line that connects two cameras, or to be more specific, on a straight line that connects the viewpoints of two cameras, and in the vicinity of the straight line, a three-dimensional position cannot be calculated. This is because a disparity, which is a difference in the directions from the two viewpoints becomes 0 or close to 0. In particular, in the case where a camera that includes a fish-eye lens with a viewing angle equal to or larger than 180° is used, the field of view necessarily includes an area for which a three-dimensional position cannot be calculated because the disparity is 0. Accordingly, as a method of obtaining a wide-angle image and a three-dimensional position, a method in which a plurality of sets of cameras are used, a set of cameras being constituted by a plurality of cameras having a viewing angle of less than 180° and attaining stereo vision, or a method of using three or more cameras including fish-eye lenses with a viewing angle equal to or larger than 180° was investigated.

Figure 14A:
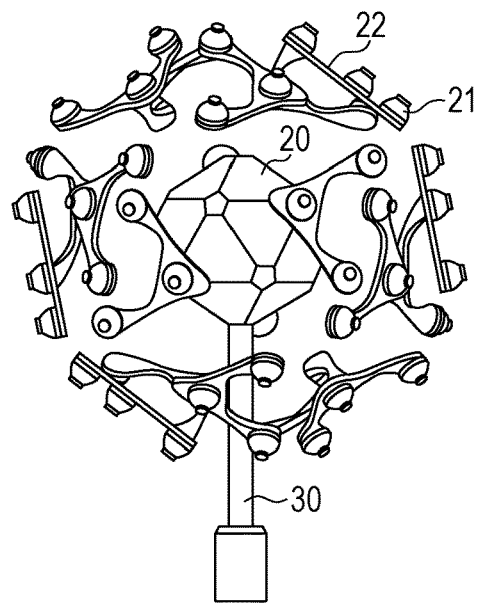
FIGS. 14A and 14B are schematic diagrams illustrating examples of configurations of image capturing apparatuses according to the related art.

FIG. 14A illustrates an apparatus having a configuration in which a plurality of cameras having a viewing angle of less than 180° are disposed on the same member, the plurality of cameras are used as one set of stereo cameras, and the one set of stereo cameras is disposed on each surface of a polyhedron. Such an apparatus is disclosed in Japanese Unexamined Patent Application Publication No. 2001-285692, for example. An omnidirectional (spherical) three-dimensional position can be obtained by using the apparatus. In this technique, the viewing angle of each set of stereo cameras is sufficiently less than 180°, and therefore, an area for which a three-dimensional position cannot be calculated because of the disparity of 0 does not exist. However, many cameras, for example, 12 to 60 cameras, are required for (spherical) measurement with a viewing angle of 360°.

Figure 14B:
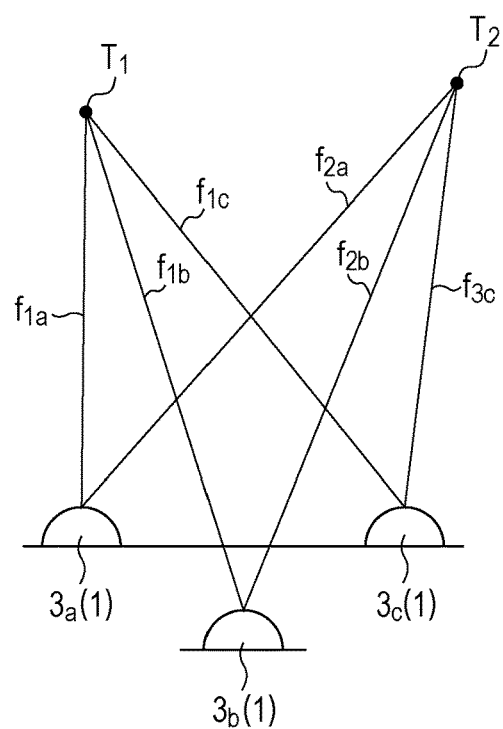
Figure 15:
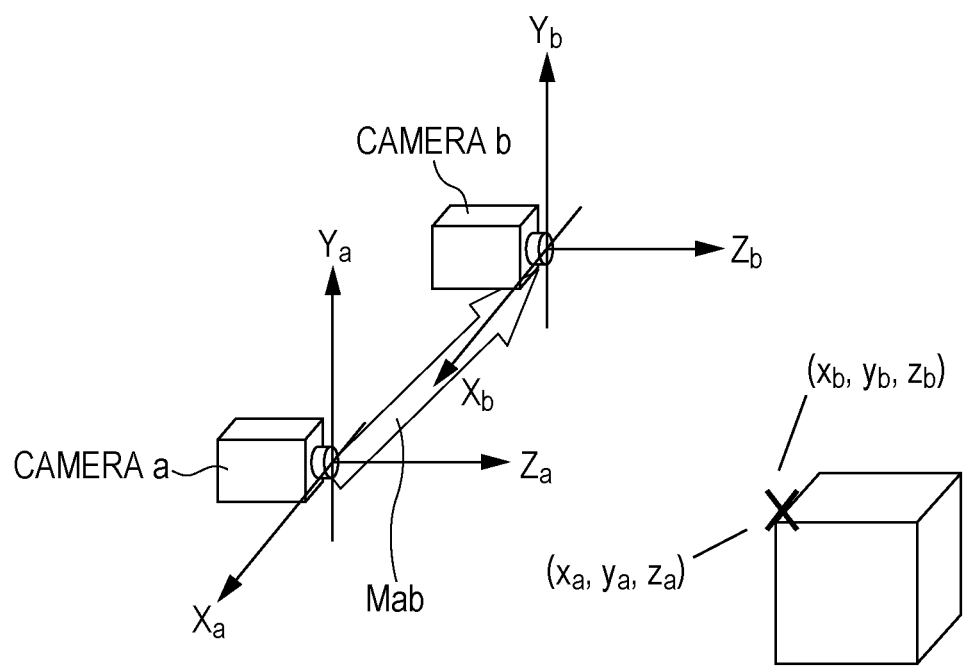
FIG. 15 is a schematic diagram illustrating camera coordinate systems and an external parameter regarding cameras.

On the other hand, Japanese Unexamined Patent Application Publication No. 6-167564 and Japanese Unexamined Patent Application Publication No. 2007-24647 disclose a method of obtaining a wide-range image and a three-dimensional position with fewer cameras. For example, FIG. 14B illustrates an apparatus that is disclosed in Japanese Unexamined Patent Application Publication No. 6-167564 and that uses a group of cameras including fish-eye lenses having a wide viewing angle. In this technique, wide-angle fish-eye images are obtained using cameras including fish-eye lenses, moving objects are detected from each fish-eye image to calculate a straight-line equation regarding a straight line that passes through each moving object, and a straight line equation group composed of one set of a plurality of straight-line equations is obtained for each moving object. In this way, three-dimensional position coordinates are determined to thereby track an object that is moving in the field of view at high speed or simultaneously track a plurality of target objects.

According to the related art described above, in an image capturing apparatus including a plurality of cameras having fish-eye lenses, an image captured by a camera among the plurality of cameras may include an area in which the other cameras among the plurality of cameras are visible. That is, in an image captured by a camera, an object, for example, which is located behind the other cameras, is not visible because the object is occluded, and therefore, an image and the three-dimensional position of the object cannot be obtained.

Accordingly, an image capturing apparatus according to one aspect of the present disclosure is an image capturing apparatus that captures a plurality of images, calculates a three-dimensional position from the plurality of images that have been obtained, and outputs the plurality of images and information about the three-dimensional position, the image capturing apparatus including an image capturing unit, a camera parameter storage unit, a position calculation unit, a position selection unit, and an image complementing unit. The image capturing unit is configured to generate and output the plurality of images by performing image capturing using at least three cameras, the cameras being arranged such that optical axes thereof are substantially parallel to one another and the cameras are close to one another. The camera parameter storage unit is configured to store in advance camera parameters including external parameters regarding physical arrangement of the cameras, internal parameters regarding characteristics of the cameras, and occlusion information that includes information indicating whether or not an area in an image captured by each of the cameras is an area occluded by the other cameras. The position calculation unit is configured to receive the plurality of images and the camera parameters, and to calculate three dimensional positions of a plurality of points from two or more sets of images formed by using the plurality of images and the camera parameters. The position selection unit is configured to receive pieces of position information about the plurality of points that have been calculated by the position calculation unit and the occlusion information stored in the camera parameter storage unit, to select a piece of position information relating to a subject area that does not have an occlusion from among the pieces of position information about the plurality of points, and to output the selected piece of position information as selected position information. The image complementing unit is configured to receive the plurality of images and the selected position information, to generate a complementary image on the basis of the selected position information by complementing an occluded area that is present in one of the plurality of images using the other images, and to output the complementary image and the selected position information.

According to the configuration described above, a complementary image that does not include an area in which cameras included in the image capturing apparatus are visible and the three-dimensional position of a subject can be obtained.

Furthermore, the at least three cameras may each have a viewing angle that is approximately equal to or larger than 180°, for example.

Furthermore, a distance between optical axis centers of two adjacent cameras among the at least three cameras may be smaller than the sum of diameters of lenses of the two cameras, for example.

Furthermore, the distance between the optical axis centers of the two adjacent cameras may be approximately equal to an average diameter of the lenses of the two cameras, for example.

Furthermore, the position selection unit may select a piece of position information relating to an area that is not occluded from among the pieces of information about the plurality of points on the basis of the occlusion information, perform weighted addition on the selected piece of position information on the basis of a magnitude of a disparity, and generate the selected position information.

Furthermore, the position selection unit may perform weighted addition on the selected piece of position information on the basis of the magnitude of the disparity while increasing a weighted value in a case where the selected piece of position information relates to a large disparity, and generate the selected position information.

Furthermore, the position selection unit may perform weighted addition on the selected piece of position information on the basis of a component of the disparity in a radial direction and a component of the disparity in a tangential direction, and generate the selected position information.

Furthermore, the position selection unit may perform weighted addition on the selected piece of position information on the basis of the magnitude of the disparity while increasing the weighted value as the component of the disparity in the tangential direction increases and the component of the disparity in the radial direction decreases, and generate the selected position information.

Furthermore, in a case where space, an image of which and a three-dimensional position in which are to be obtained, is three-dimensional space that extends along a flat surface, the image capturing apparatus may be arranged such that the optical axes of the cameras are substantially parallel to a direction normal to the flat surface.

A monitoring system according to one aspect of the present disclosure is a monitoring system including the above-described image capturing apparatus, an obstacle detection unit, and a display. The obstacle detection unit is configured to receive the complementary image and the selected position information, to detect an obstacle area on the basis of the selected position information, and to generate a composite image in which the obstacle area that has been detected is distinguishably displayed. The display is configured to display the composite image.

An image processing apparatus according to one aspect of the present disclosure is an image processing apparatus that calculates a three-dimensional position from a plurality of images and outputs the plurality of images and the three-dimensional position. The plurality of images are captured by using at least three cameras that are arranged such that optical axes thereof are parallel to one another and the cameras are close to one another. The image processing apparatus includes a camera parameter storage unit, a position calculation unit, a position selection unit, and an image complementing unit. The camera parameter storage unit is configured to store in advance camera parameters including external parameters regarding physical arrangement of the cameras, internal parameters regarding characteristics of the cameras, and occlusion information that includes information indicating whether or not an area in an image captured by each of the cameras is an area occluded by the other cameras. The position calculation unit is configured to receive the plurality of images and the camera parameters, and to calculate three dimensional positions of a plurality of points from two or more sets of images formed by using the plurality of images and the camera parameters. The position selection unit is configured to receive pieces of position information about the plurality of points that have been calculated by the position calculation unit and the occlusion information in the camera parameter storage unit, to select a piece of position information relating to a subject area that does not have an occlusion from among the pieces of position information about the plurality of points, and to output the selected piece of position information as selected position information. The image complementing unit is configured to receive the plurality of images and the selected position information, to generate a complementary image on the basis of the selected position information by complementing an occluded area that is present in one of the plurality of images using the other images, and to output the complementary image and the selected position information.

An image capturing method according to one aspect of the present disclosure is an image capturing method using an image capturing apparatus. The image capturing apparatus captures a plurality of images, calculates a three-dimensional position from the plurality of images, and outputs the plurality of images and the three-dimensional position. The image capturing apparatus includes an image capturing unit and a camera parameter storage unit. The image capturing unit captures images using at least three cameras that are arranged such that optical axes thereof are parallel to one another and the cameras are close to one another, and generates and outputs the plurality of images. The camera parameter storage unit stores camera parameters including external parameters regarding physical arrangement of the cameras, internal parameters regarding characteristics of the cameras, and occlusion information that includes information indicating whether or not an area in an image captured by each of the cameras is an area occluded by the other cameras. The image capturing method includes the steps of: calculating three-dimensional positions of a plurality of points from two or more sets of images formed by using the plurality of images and the camera parameters; receiving pieces of position information about the plurality of points and the camera parameters, selecting a piece of position information relating to a subject area that does not have an occlusion from among the pieces of position information about the plurality of points, and outputting the selected piece of position information as selected position information; generating a complementary image on the basis of the selected position information by complementing an occluded area that is present in one of the plurality of images using the other images; and outputting the complementary image and the selected position information.

A non-transitory computer readable recording medium according to one aspect of the present disclosure is a non-transitory computer readable recording medium recording an image processing program that causes an apparatus including a processor to perform image processing. The image processing program calculates a three-dimensional position from a plurality of images, the image processing program being executed by a computer of an image processing apparatus that outputs the plurality of images and the three-dimensional position. The plurality of images are captured by using at least three cameras that are arranged such that optical axes thereof are parallel to one another and the cameras are close to one another. The image processing apparatus stores in advance camera parameter including external parameters regarding physical arrangement of the cameras, internal parameters regarding characteristics of the cameras, and occlusion information that includes information indicating whether or not an area in an image captured by each of the cameras is an area occluded by the other cameras. The image processing program causes the computer to execute the steps of: receiving the plurality of images and the camera parameters; calculating three-dimensional positions of a plurality of points from two or more sets of images formed by using the plurality of images and the camera parameters; receiving pieces of position information about the plurality of points and the camera parameters, selecting a piece of position information relating to a subject area that does not have an occlusion from among the pieces of position information about the plurality of points, and outputting the selected piece of position information as selected position information; generating a complementary image on the basis of the selected position information by complementing an occluded area that is present in one of the plurality of images using the other images; and outputting the complementary image and the selected position information.

An image capturing apparatus according to one aspect of the present disclosure is an image capturing apparatus including an image capturing unit, a camera parameter obtaining unit, a position calculating unit, a position selection unit, and an image complementing unit. The image capturing unit includes a plurality of cameras including a first camera, a second camera, and a third camera, the plurality of cameras outputting pieces of image data, the plurality of cameras being arranged such that optical axes thereof are parallel to one another and the plurality of cameras are close to one another. The camera parameter obtaining unit is configured to obtain camera parameters including position information about the plurality of cameras, focal lengths of the plurality of cameras, and occlusion information that includes information indicating whether or not each pixel in the pieces of image data is included in an occluded area, a pixel included in the occluded area being a pixel that corresponds to a captured image of a portion included in the image capturing apparatus. The position calculating unit is configured to generate a plurality of pieces of position information on the basis of the pieces of image data and the camera parameters, the plurality of pieces of position information each including three-dimensional position information and pixel pair information, two pixels specified by the pixel pair information being located at corresponding points, the three-dimensional position information being determined on the basis of position information about the two pixels. The position selection unit is configured to generate selected position information, the selected position information being generated by selecting certain pieces of position information from among the plurality of pieces of position information, the certain pieces of position information each including certain pixel pair information, neither of pixels specified by the certain pixel pair information being included in the occluded area. The image complementing unit is configured to determine a pixel value of a target pixel that is included in a piece of image data of an image captured by the third camera and is included in an occluded area, by using pixel values of pixels that are specified by the pixel pair information included in the selected position information and that have been selected, the selected pixels being pixels in a piece of image data of an image captured by the first camera or the second camera, the target pixel and one of the selected pixels being located at corresponding points, whether or not the target pixel and the one of the selected pixels are located at corresponding points being determined on the basis of the camera parameters and three-dimensional position information corresponding to the selected pixels.

Hereinafter, embodiments of an image capturing apparatus according to the present disclosure will be described with reference to the attached drawings. Note that, in this specification, the three-dimensional position of a subject, an image of which has been captured by the image capturing apparatus according to the present disclosure, is simply referred to as a "three-dimensional position". The term "subject" here means a monitor target in the case where the image capturing apparatus is used in monitoring, means an intended image capture target in the case of use in general image capturing, and means one or a plurality of objects (obstacles) that are present in a captured image in the case of use in obstacle detection, for example. However, any element that is present in a captured image may be called a "subject" in this specification regardless of whether an image of the subject is intentionally captured or unintentionally captured.

Embodiments described hereinafter indicate specific or generic examples of the present disclosure. The values, shapes, materials, constituent elements, positions and connections of the constituent elements, steps, and orders of the steps indicated in Embodiments are examples, and do not limit the present disclosure. The constituent elements in Embodiments that are not described in independent Claims that describe the most generic concept of the present disclosure are described as arbitrary constituent elements.

First Embodiment

In this embodiment, an example will be described in which an image capturing apparatus of the present disclosure is mounted in a vehicle and used in obstacle detection.

FIG. 1A illustrates a configuration of an image capturing apparatus 1 in this embodiment. FIGS. 2A and 2B illustrate examples of two different structures of an image capturing unit 100 in the image capturing apparatus 1.

As illustrated in FIG. 1A, the image capturing apparatus 1 includes the image capturing unit 100, an image processing unit 110, an obstacle detection unit 120, and a display 130.

The image capturing unit 100 includes three or more cameras 101a to 101d each having a fish-eye lens. The image processing unit 110 includes a position calculation unit 111, a position selection unit 112, an image complementing unit 113, and a camera parameter storage unit 114. Note that suffixes a to d are used in order to distinguish four cameras, however, the cameras 101a to 101d are hereinafter described as "cameras 101" without using the suffixes in the case of not particularly distinguishing the cameras.

FIGS. 2A and 2B illustrate examples of configurations of the image capturing unit 100 of the image capturing apparatus 1. FIG. 2A illustrates an example of the image capturing unit 100 having a configuration in which four cameras 101 are integrally fixed with one another, and includes a front view, a side view, and a cross-sectional view. FIG. 2B illustrates an example of the image capturing unit 100 having another configuration in which three cameras 101 are integrally fixed with one another, and includes a front view and a side view. In both examples of the image capturing unit 100, it is assumed that the lenses of the cameras are fish-eye lenses with substantially the same diameter, the center optical axes are parallel to one another, and two adjacent lenses are closely arranged. Therefore, in the examples, the distance between the optical axis centers of two adjacent cameras is approximately equal to the diameter of the lenses.

Note that the above-described image capturing apparatus 1 may include at least the image capturing unit 100 and the image processing unit 110. The obstacle detection unit 120 and the display 130 may be apparatuses provided outside the image capturing apparatus 1, that is, a personal computer (PC) and a display of the PC, for example. The image processing unit 110 and the obstacle detection unit 120 may be connected to each other with wires or may be wirelessly connected to each other. The image processing unit 110 and the obstacle detection unit 120 may be connected to each other on a one-to-one basis, or may be connected to each other over a communication network.

The configurations of the cameras 101 in the image capturing unit 100 described above are based on knowledge described below obtained by the present inventors.

One of the causes of an error in estimation of a three-dimensional position in stereo vision is a quantization error in disparity estimation. A quantization error is an error caused by estimating a disparity in increments of one pixel, although a disparity is actually denoted as a real number. The degree of such a quantization error can be assumed to be constant, and therefore, a quantization error has a lesser impact and a three-dimensional position becomes more accurate as the disparity increases (as the length of the disparity vector increases). Accordingly, a plurality of cameras that form a set for stereo vision are generally arranged such that the baseline length, which is the distance between the cameras, is sufficiently long in order to increase the disparity.

On the other hand, a subject image captured by a camera having a fish-eye lens is largely distorted, and therefore, the shape, size, and orientation of the subject image vary depending on the three-dimensional position of the subject in the field of view, in other words, depending on the position of the subject in the image.

In the case where images captured by two cameras having fish-eye lenses are used in stereo vision, the shape, size, and orientation of a subject image largely vary as the disparity increases. Therefore, association of the positions of a subject in the two images, that is, estimation of the disparity, becomes difficult, resulting in more errors or mistakes in estimated disparities, which has also been a problem.

Figure 13:
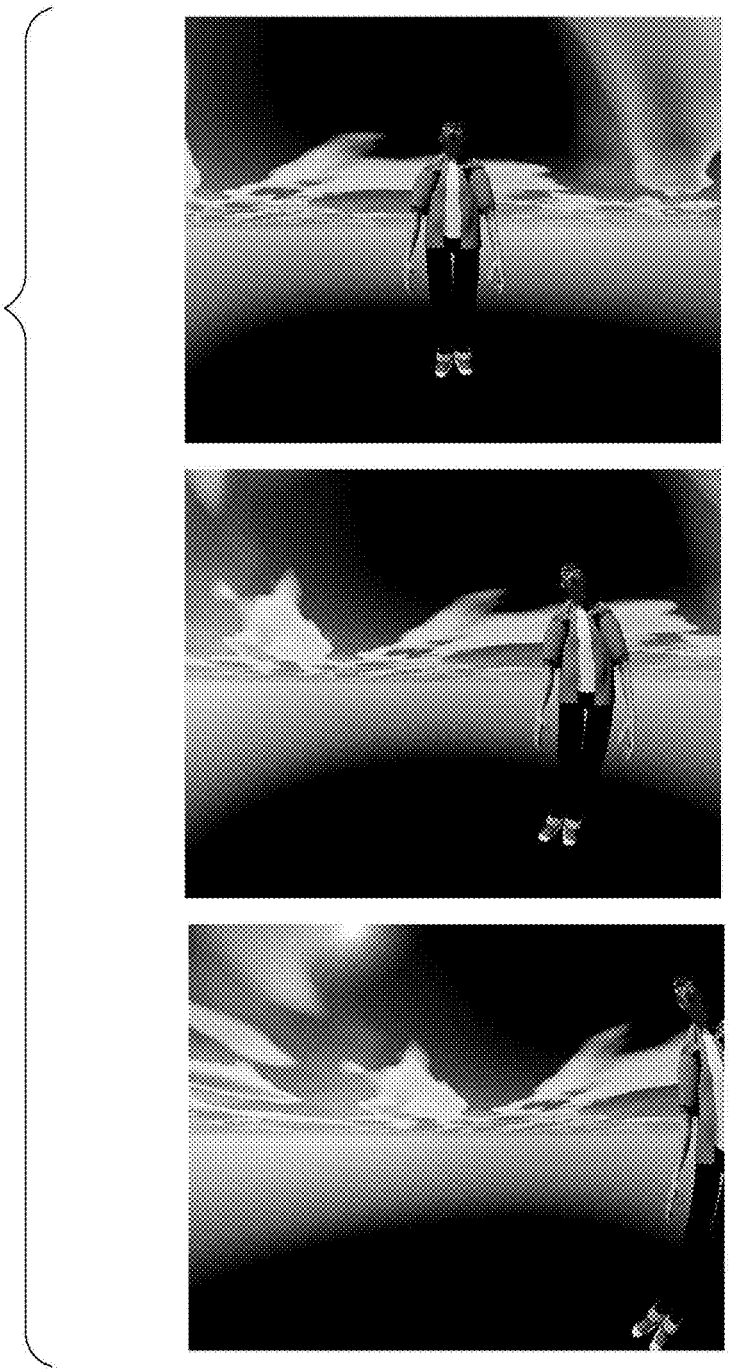
FIG. 13 illustrates examples of differences in the shape, size, and orientation of a subject image depending on the position in an image in the first embodiment.

As an example of the above-described case, FIG. 13 illustrates examples of subject images captured while the distance between the subject and the camera is kept constant (1 m) and the orientation of the camera is changed to 0°, 45°, and 90°. It is found from FIG. 13 that the appearance (shape, size, and orientation) of a subject image varies depending on the position in the image. This is because a distortion caused by a fish-eye lens differs depending on the angle from the center optical axis. It is anticipated that association of the positions of the subject is difficult between the uppermost image relating to the angle of 0° and the lowermost image relating to the angle of 90°. Such differences in the shape, size, and orientation of the subject image between two images become more noticeable as the baseline length between the cameras increases or the distance between the subject and the image capturing apparatus decreases. Accordingly, in the case where the distance between the subject and the image capturing apparatus cannot be kept to a certain length or longer, in particular, an impact caused by such a condition can be reduced by making the baseline length shorter.

In this embodiment, the image capturing unit 100 having a configuration in which a plurality of cameras having fish-eye lenses are closely arranged such that the optical axes are parallel to one another (FIG. 2A or FIG. 2B) is used so that the disparity in the plurality of fish-eye cameras does not become too large even in the case where a subject is located near the image capturing apparatus 1. In doing so, an effect is expected to be attained such that errors or mistakes in estimated disparities can be reduced. Furthermore, by using a technique for disparity estimation with an accuracy denoted by a real number, an effect is also expected to be attained such that quantization errors in disparity estimation, which have been a problem, can be reduced.

However, in the case where a plurality of cameras, for example, the first camera and the second camera, each including a fish-eye lens having a viewing angle of 180° are closely arranged, the lens or the body of the first camera is visible in an image captured by the second camera. That is, another problem arises in which a subject located behind the first camera is occluded by the lens or the body of the first camera and is not visible in an image captured by the second camera. For example, in the image capturing apparatus using three or more fish-eye cameras according to the related art (FIG. 14B), the baseline length between two cameras is long, and therefore, even in the case where an image captured by a camera includes an area in which the lens or the body of another camera is visible, the proportion of the area to the field of view is small. On the other hand, in the case where cameras are closely arranged as in FIG. 2A or 2B, an area, which is occluded by a lens and an image of which cannot be obtained, becomes larger. Furthermore, two images are used in calculation of a three-dimensional position, and therefore, a three-dimensional position cannot be calculated if either one of the two images includes an occluded area. Consequently, an area for which a three-dimensional position cannot be calculated becomes larger to an area equivalent to the sum of the occluded areas of the two images.

Accordingly, the inventors of the present application have developed a technique in which an occluded area in an image captured by a camera including a fish-eye lens is complemented by an image having no occlusion and a three-dimensional position is calculated from two images having no occlusion. As a result, an image that has no occlusion and a three-dimensional position can be obtained. Note that information about an occluded area in an image can be obtained in advance on the basis of the physical arrangement of a plurality of lenses and the specifications of the lenses.

Note that it is assumed in this specification that the viewing angle of the fish-eye lenses is approximately 180° or is equal to or larger than 180°, which is described as "approximately equal to or larger than 180°". An angle of approximately 180° includes an angle equal to or less than 180°, that is, an angle between 160° and 180°, for example. An angle that is equal to or larger than 180° includes an angle that is equal to or larger than 180° and equal to or less than 230°, for example.

A "disparity" is a difference in a direction in which a target point is in sight due to a difference in the positions of two observation points. In this specification, both a difference in a direction in three-dimensional space and a difference in a position in a two-dimensional projection image are called disparities without distinguishing the two differences.

In the image capturing apparatus 1, the image capturing unit 100 captures images of the field of view, the image processing unit 110 generates an image in which an occluded area is complemented and calculates a three-dimensional position using the captured images, the obstacle detection unit 120 generates a composite image on the basis of the images of the field of view and the three-dimensional position, and the display 130 displays the composite image.

The image capturing unit 100 includes the four cameras 101a to 101d that include fish-eye lenses having a viewing angle of approximately 180°. The four cameras 101a to 101d are arranged as illustrated in FIG. 2A. The four cameras 101a to 101d each capture an image of the field of view and output the image (hereinafter such an image is called a camera image). That is, the four cameras 101a to 101d output four camera images (image data). The distance between the optical axis centers of two adjacent cameras may be made smaller than the sum of the diameters of the lenses of the two cameras. As the distance between the optical axis centers of the two cameras becomes shorter, or as the diameter of the lens becomes larger, in a camera image captured by one of the cameras, wider part of the lenses of the other cameras is visible and wider part of an object, for example, which is located behind the other cameras, is occluded. In the case where the distance between the optical axis centers of two cameras is smaller than the sum of the diameters of the lenses of the two cameras, an occluded area becomes wider and noticeable. However, in the disclosure of the present application, an image that does not have an occlusion caused by other cameras and a three-dimensional position can be obtained.

The distance between the optical axis centers of two adjacent cameras may be made approximately equal to the average diameter of the lenses of the two cameras. As the distance between the optical axis centers of the two cameras becomes shorter, in a camera image captured by one of the cameras, wider part of the other cameras is visible and an object, for example, which is located behind the other cameras, is occluded. In the case where two cameras are arranged closest to each other, that is, in the case where the lenses of two cameras are in contact with each other, the distance between the optical axis centers of the two cameras becomes approximately equal to the average diameter of the lenses of the two cameras. In this case, an area for which an image and a three-dimensional position cannot be obtained because of occlusion by the other camera becomes widest in the related art. On the other hand, even in the case where the distance between the optical axis centers of two cameras is approximately equal to the average diameter of the lenses of the two cameras, an image that does not have an occlusion caused by the other camera and a three-dimensional position can be obtained in the disclosure of the present application. In other words, in the case where the distance between the optical axis centers of two cameras is approximately equal to the average diameter of the lenses of the two cameras, the disclosure of the present application is most effective.

The image processing unit 110 includes the position calculation unit 111, the position selection unit 112, the image complementing unit 113, and the camera parameter storage unit 114.

The camera parameter storage unit 114 stores a camera parameter for each of the four cameras 101.

A camera parameter includes an external parameter, an internal parameter, and occlusion information.

An external parameter includes information about the physical arrangement of the cameras 101, such as the positions and orientations of the cameras 101.

An internal parameter includes information about the characteristics of each camera, such as the lens distortion and focal length.

Occlusion information includes information that indicates an area in a camera image which is occluded by the image capturing apparatus 1. The occlusion information may be information that specifies a pixel, the output pixel value of which is a value obtained by capturing an image of a portion included in the image capturing apparatus 1.

The position calculation unit 111 receives four camera images outputted from the four cameras 101, uses two camera images among the four camera images as one set, and estimates a disparity between two camera images for six sets.

The position calculation unit 111 reads the camera parameters regarding the four cameras 101 from the camera parameter storage unit 114.

The position calculation unit 111 calculates a three-dimensional position on the basis of the estimated disparity between two camera images for six sets and the external parameters and the internal parameters included in the camera parameters, and outputs the three-dimensional position as position information.

The position calculation unit 111 may generate a plurality of pieces of position information on the basis of the camera parameters. The plurality of pieces of position information may each include three-dimensional position information and pixel pair information, two pixels specified by the pixel pair information may be located at corresponding points, the three-dimensional position information may be determined on the basis of position information about the two pixels, and the two pixels may be included in different cameras respectively.

The position selection unit 112 obtains the position information outputted by the position calculation unit 111, and reads the camera parameters from the camera parameter storage unit 114.

The position selection unit 112 selects and outputs at least part of the position information which does not relate to an occluded area as selected position information on the basis of the occlusion information included in the camera parameters.

The position selection unit 112 may generate selected position information, the selected position information may be generated from a plurality of pieces of position information while certain pieces of position information are excluded, the certain pieces of position information may each include certain pixel pair information, and at least either of the pixels that are specified by the certain pixel pair information may be included in an occluded area.

The image complementing unit 113 obtains the camera images and the selected position information outputted from the position selection unit 112.

The image complementing unit 113 replaces an occluded area in at least one of the camera images with an image of the occluded area on the basis of unoccluded areas in the other camera images and the selected position information to generate a complementary image that does not include an occluded area, and outputs the complementary image and the selected position information.

The image complementing unit 113 may determine the pixel value of a target pixel that is included in an occluded area and that is included in a camera that does not include a pixel specified by the pixel pair information, by using the pixel values of selected pixels that are specified by the pixel pair information included in the selected position information. The target pixel and one of the selected pixels may be located at corresponding points, and whether or not the target pixel and one of the selected pixels are located at corresponding points may be determined on the basis of the camera parameters and three-dimensional position information corresponding to the selected pixels.

The obstacle detection unit 120 obtains the complementary image and the selected position information, detects an obstacle on the basis of the selected position information, superimposes and combines a frame that indicates an attention area on an area in the complementary image which corresponds to the position of the detected obstacle, and outputs the result as a composite image.

The display 130 obtains and displays the composite image.

Each of the constituent elements that constitute the image processing unit 110 and the obstacle detection unit 120 in FIG. 1A may be implemented by hardware, such as an electronic circuit or an integrated circuit, or may be implemented by software, such as a program that runs on a computer.

Figure 1B:
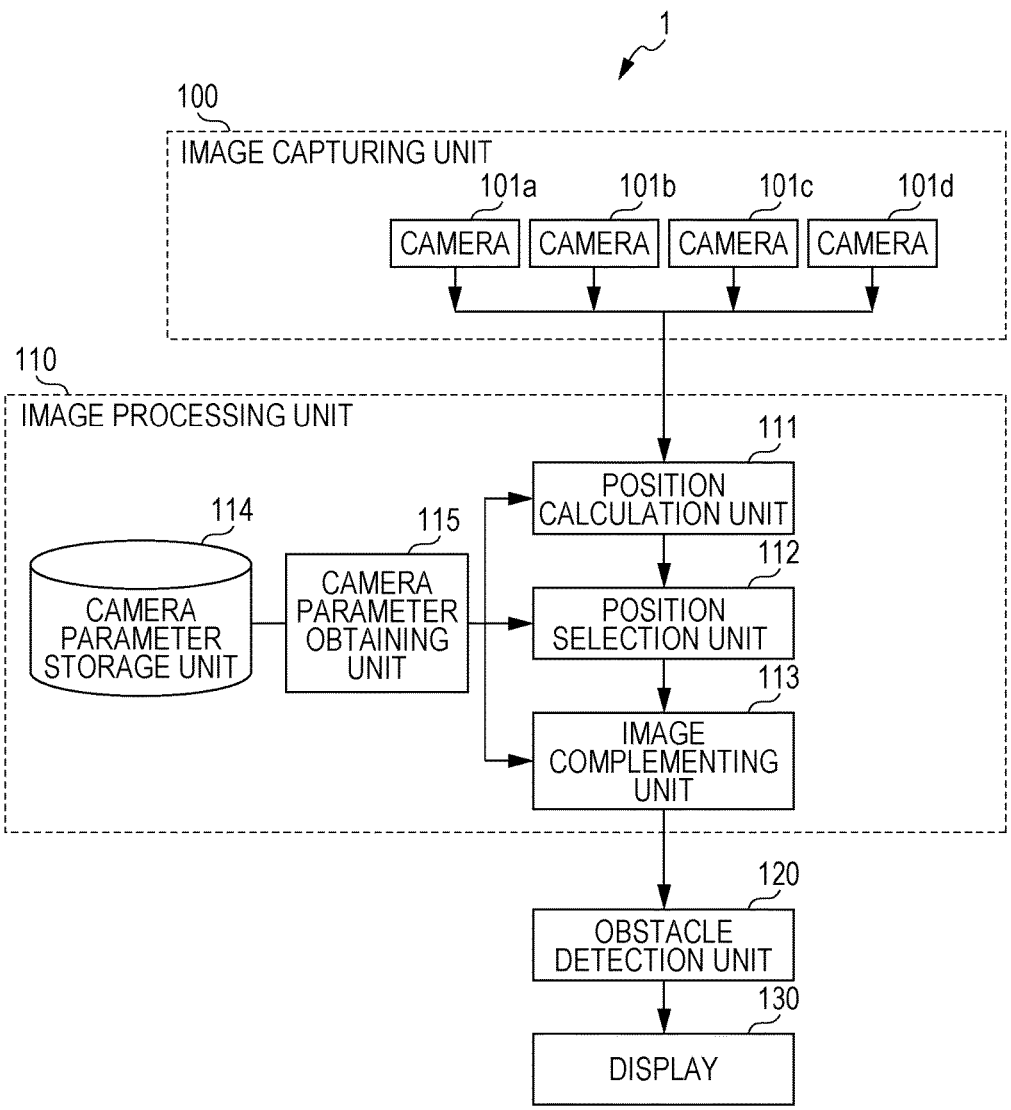
FIG. 1B is a block diagram illustrating a configuration of the image capturing apparatus according to the first embodiment.
Figure 2A:
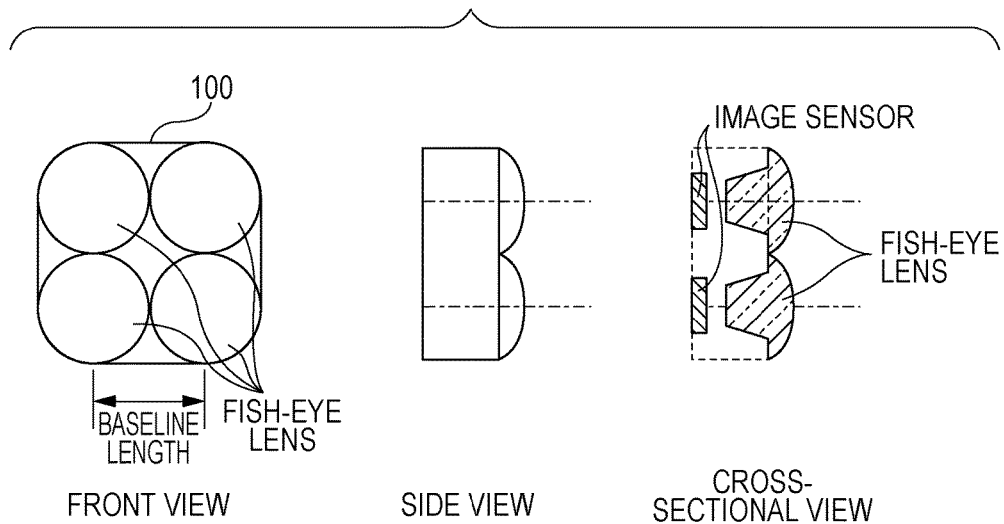
FIGS. 2A and 2B are schematic diagrams illustrating configurations of an image capturing unit according to the first exemplary embodiment of the present disclosure.
Figure 2B:
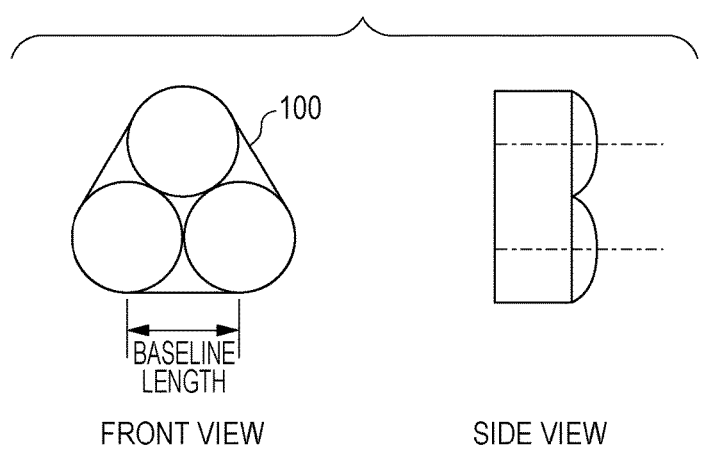

Note that the image processing unit 110 may include the position calculation unit 111, the position selection unit 112, the image complementing unit 113, the camera parameter storage unit 114, and a camera parameter obtaining unit 115 as illustrated in FIG. 1B.

The image processing unit 110 need not include the camera parameter storage unit 114, and an external apparatus (such as a cloud server) may include the camera parameter storage unit 114, for example.

In this case, the camera parameter storage unit 114 may be connected to the camera parameter obtaining unit 115 by wireless or wired communication means, and the camera parameter obtaining unit 115 may obtain information, such as the camera parameters, stored in the camera parameter storage unit 114.

The camera parameter obtaining unit 115 may obtain, from the camera parameter storage unit 114, the camera parameters that include position information regarding the plurality of cameras, the focal lengths of the plurality of cameras, and occlusion information including information that indicates a pixel, among the pixels included in the plurality of cameras, which is included in an occluded area.

The position calculation unit 111, the position selection unit 112, and the image complementing unit 113 may exchange information with the camera parameter storage unit 114 (for example, may read information stored in the camera parameter storage unit 114) via the camera parameter obtaining unit 115.

The position calculation unit 111 may read the camera parameters regarding the four cameras 101 from the camera parameter storage unit 114 via the camera parameter obtaining unit 115.

The position selection unit 112 may obtain the position information outputted by the position calculation unit 111, and may read the camera parameters from the camera parameter storage unit 114 via the camera parameter obtaining unit 115.

Figure 3:
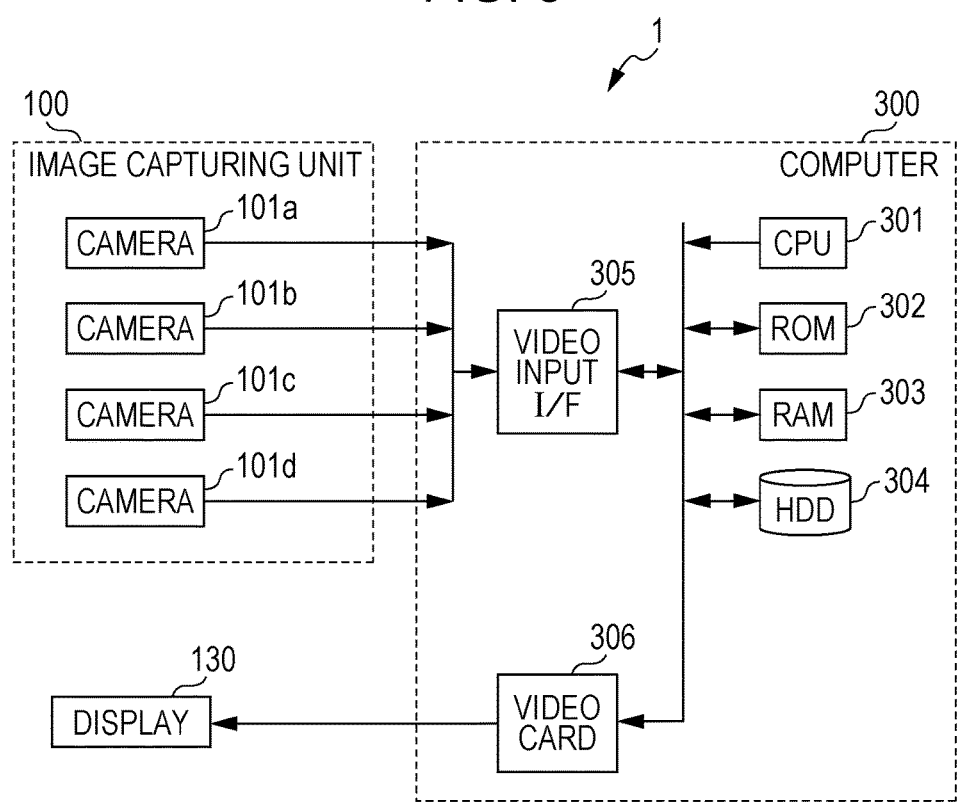
FIG. 3 is a block diagram illustrating a configuration of the image capturing apparatus including an image processing unit constituted by a computer.

FIG. 3 is a diagram illustrating a hardware configuration of the image capturing apparatus 1 in this embodiment which is constituted by a computer. In FIG. 3, the image capturing unit 100 captures and outputs images of the field of view, and the computer 300 obtains the images, and generates and outputs a complementary image and selected position information. The display 130 displays a composite image generated by the computer 300.

The three or more cameras 101a, 101b, 101c, and so on correspond to the image capturing unit 100.

The computer 300 includes a central processing unit (CPU) 301, a read-only memory (ROM) 302, a random access memory (RAM) 303, a hard disk drive (HDD) 304, a video input interface (I/F) 305, and a video card 306. A program that operates the computer 300 is retained in the ROM 302 or the HDD 304 in advance. The program is loaded from the ROM 302 or the HDD 304 and restored in the RAM 303 by the CPU 301, which is a processor. The CPU 301 executes coded instructions in the program that has been restored in the RAM 303. The video input I/F 305 takes images captured by the image capturing unit 100 into the RAM 303 in accordance with the program that is executed. The video card 306 outputs an image generated as a result of execution of the program, and the display 130 displays the image. The computer 300 corresponds to the image processing unit 110 and the obstacle detection unit 120. The camera parameter storage unit 114 corresponds to the ROM 302, the RAM 303, or the HDD 304.

Note that the computer program need not be stored in the ROM 302 or the HDD 304, which are semiconductors, and may be stored in a CD-ROM, for example. The computer program may be transmitted over a wired or wireless network or by broadcasting, for example, and may be taken into the RAM 303 of the computer 300.

Hereinafter, operations performed by the image capturing apparatus 1 in this embodiment will be described with reference to FIG. 4.

Figure 4:
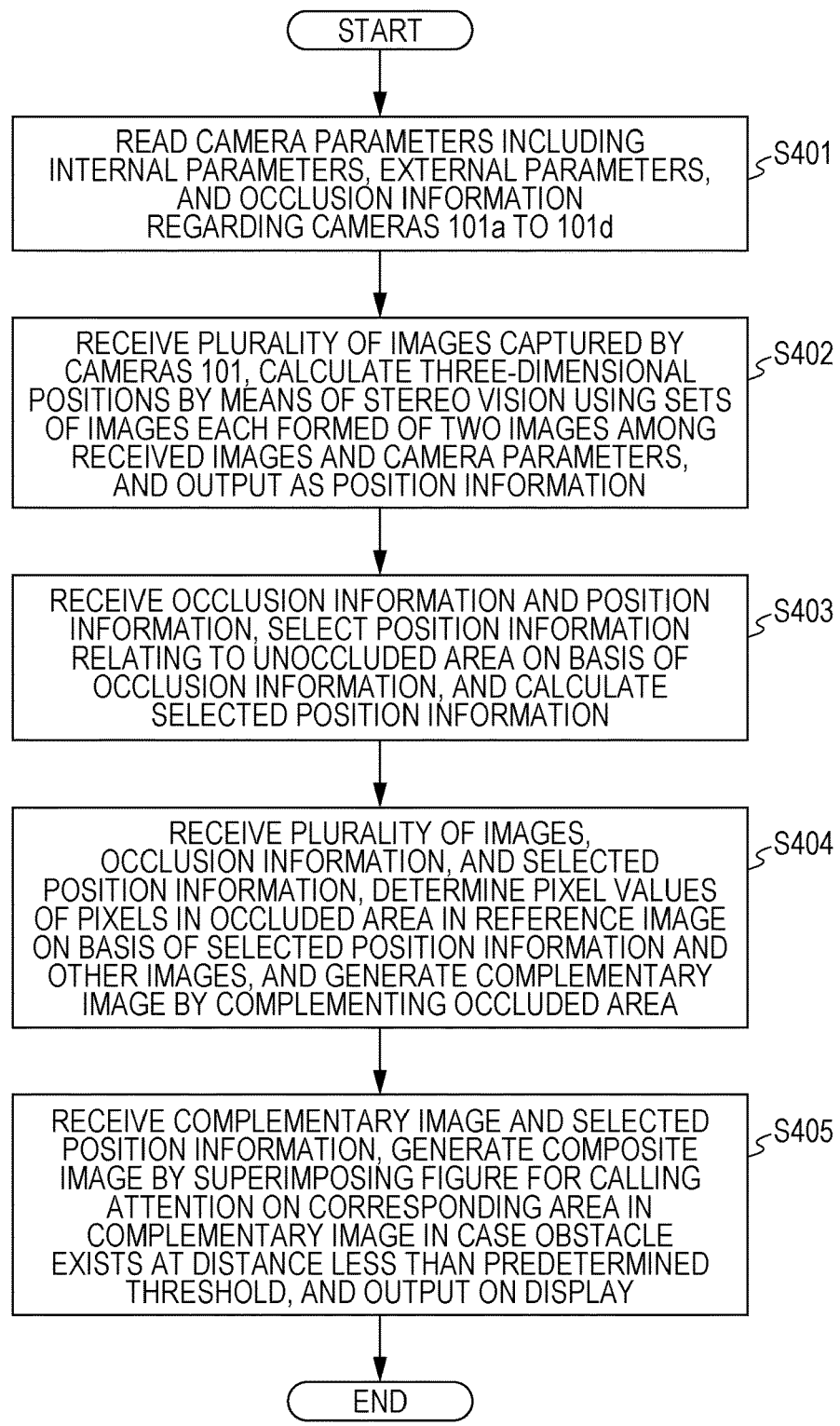
FIG. 4 is a flowchart illustrating a procedure of operations performed by the image processing unit according to the first embodiment.

FIG. 4 is a flowchart illustrating operations performed by the image processing unit 110 and the obstacle detection unit 120 of the image capturing apparatus 1. In FIG. 4, five steps S401 to S405 are performed by the computer 300 in FIG. 3.

Note that each step in FIG. 4 may be performed by each processing unit included in the image processing unit 110 and the obstacle detection unit 120 in FIG. 1A or FIG. 1B. That is, the camera parameter storage unit 114 and the camera parameter obtaining unit 115 may perform an operation in a camera parameter reading step S401, the position calculation unit 111 may perform an operation in a position calculation step S402, the position selection unit 112 may perform an operation in a position selection step S403, the image complementing unit 113 may perform an operation in an image complementing step S404, and the obstacle detection unit 120 may perform an operation in an obstacle detection step S405.

In this embodiment, an example will be described in which the image capturing apparatus 1 is installed in a vehicle. The image capturing apparatus 1 obtains images of an area behind the vehicle and a three-dimensional position in the area to detect an obstacle, and displays the result on the display 130 installed in the vehicle so as to show the condition behind the vehicle to the driver, who is a user.

Figure 5A:
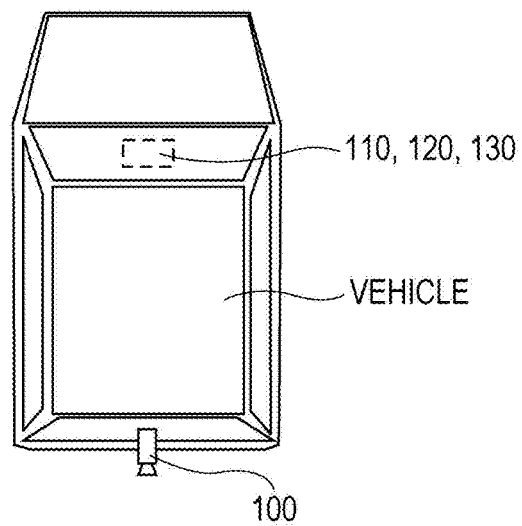
FIG. 5A is a schematic diagram illustrating an example of installation of the image capturing apparatus according to the first exemplary embodiment of the present disclosure.

FIG. 5A is a diagram illustrating an example of installation of the image capturing apparatus 1 in this embodiment. The image capturing unit 100 is installed in the rear of the vehicle such that the optical axes of the cameras 101 substantially coincide with a direction in which the vehicle travels backward in a straight line. The image processing unit 110, the obstacle detection unit 120, and the display 130 are installed in the vehicle interior at a position that the driver can see.

The four cameras 101a to 101d of the image capturing unit 100 capture and output images at regular intervals in synchronization with one another.

Figure 5B:
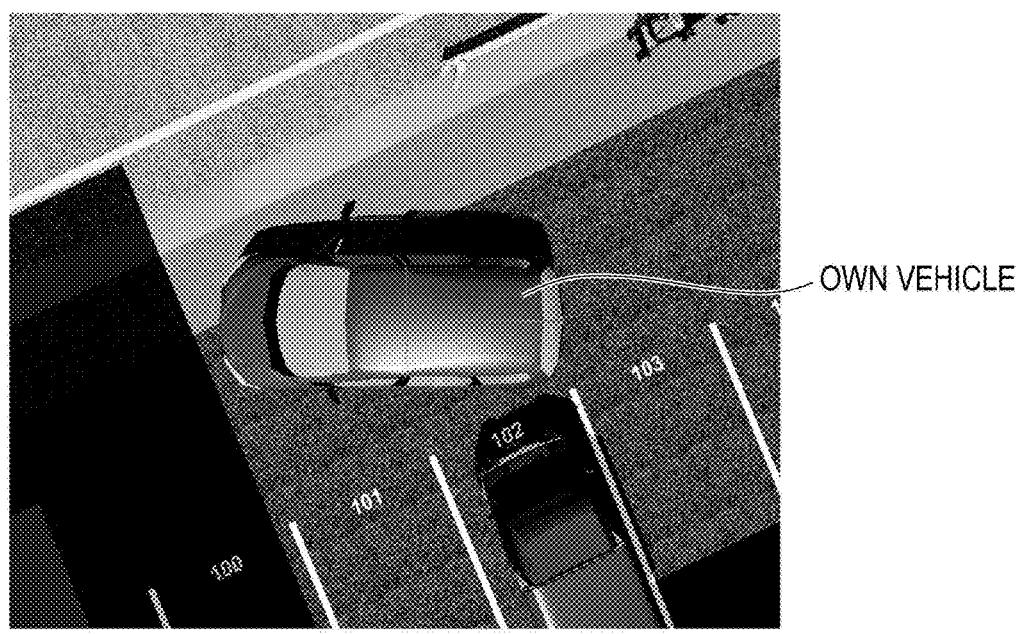
FIG. 5B illustrates an example of an image capture situation.

FIG. 6A is a diagram illustrating an example of arrangement of the four cameras 101a to 101d of the image capturing unit 100. FIG. 6B illustrates examples of images captured by the four cameras 101a to 101d in the case where the image capturing apparatus 1 is installed as illustrated in FIG. 5A and the images are captured in the situation illustrated in FIG. 5B. The inside of a circle that is in contact with the left side and the right side of each image represents subjects in the field of view with a viewing angle of 180°. In this embodiment, it is assumed that the cameras 101 each have a fish-eye lens, and its projection model is an equidistant projection model. It is also assumed that the cameras 101 can capture color images having 1280 horizontal pixels and 960 vertical pixels, and the video input I/F 305 can obtain color images having 1280 horizontal pixels and 960 vertical pixels. Note that the projection model of the cameras and the pixel number are not limited to the above, and other projection models and the pixel numbers may be allowed. As described above, in the present disclosure, a plurality of cameras are closely arranged so as to reduce errors or mistakes in disparity estimation caused by a difference in the shape, size, and orientation of a subject image, between images. In this embodiment, the shortest baseline length (FIG. 2A) is assumed to be 0.015 m. Examples of four camera images captured by the image capturing unit 100 configured as described above are illustrated in FIG. 6B. It is found that the shapes, sizes, and orientations of subjects in the four images in FIG. 6B are substantially the same. On the other hand, it is also found that, because the cameras 101 are closely arranged, the lenses of adjacent cameras are visible at the edge of the field of view in every image and a subject behind the lenses is occluded (portions with a caption "occlusion by lens of adjacent camera" in FIG. 6B).

The computer 300 executes a predetermined program in parallel with operations performed by the image capturing unit 100 to thereby perform operations in steps S401 to S405 in FIG. 4.

Hereinafter, operations in steps S401 to S405 performed by the computer 300 will be described in detail with reference to FIGS. 6 to 11.

In the camera parameter reading step S401, the camera parameters including the internal parameters, the external parameters, and the occlusion information regarding the cameras 101a to 101d which have been stored in advance are read.

Step S401 may be performed by the camera parameter obtaining unit 115.

A relationship between an external parameter regarding cameras $\{M_{q,r}\}$ and the three-dimensional coordinates is expressed by expression (1), and a relationship among an internal parameter regarding a camera (f, k), the three-dimensional coordinates, and the pixel coordinates is expressed by expression (2).

$$\{M_{q,r}\}, q = 1 \ldots 4, q \neq r \begin{pmatrix} x_r \\ y_r \\ z_r \\ 1 \end{pmatrix} = M_{qr} \begin{pmatrix} x_q \\ y_q \\ z_q \\ 1 \end{pmatrix}, \quad (1)$$

$$M = \begin{pmatrix} r_{00} & r_{01} & r_{02} & t_X \\ r_{10} & r_{11} & r_{12} & t_Y \\ r_{20} & r_{21} & r_{22} & t_Z \\ 0 & 0 & 0 & 1 \end{pmatrix}$$

$$u = \frac{1}{k} \frac{x}{\sqrt{x^2 + y^2}} r \quad (2)$$

$$v = \frac{1}{k} \frac{y}{\sqrt{x^2 + y^2}} r$$

$$r = f\theta$$

$$\theta = \tan^{-1}\left(\frac{\sqrt{x^2 + y^2}}{z}\right)$$

The external parameter $\{M_{q,r}\}$ is an aggregation of matrices that represent positional relationships of the coordinate systems of two cameras q and r. A matrix $M_{q,r}$ represents a 4×4 matrix that converts a three-dimensional position ($x_q$, $y_q$, $z_q$) in the coordinate system of the camera q into a three-dimensional position ($x_r$, $y_r$, $z_r$) in the coordinate system of the camera r. Regarding the internal parameter, f is the focal length and k is the pixel size of the pixels on the image sensor. Expression (2) represents a relationship between a three-dimensional position (x, y, z) in the camera coordinate system and pixel coordinates (u, v). The external parameter $\{M_{q,r}\}$ and the internal parameter (f, k) described above are obtained in advance using a widespread technique generally called a camera calibration method. Note that, in expression (2), an internal parameter that is assumed in the case where the projection model of the lens is based on equidistant projection is used, however, the projection model is not limited to this and other projection models, such as stereographic projection or equisolid angle projection, may be used.

Figure 7:
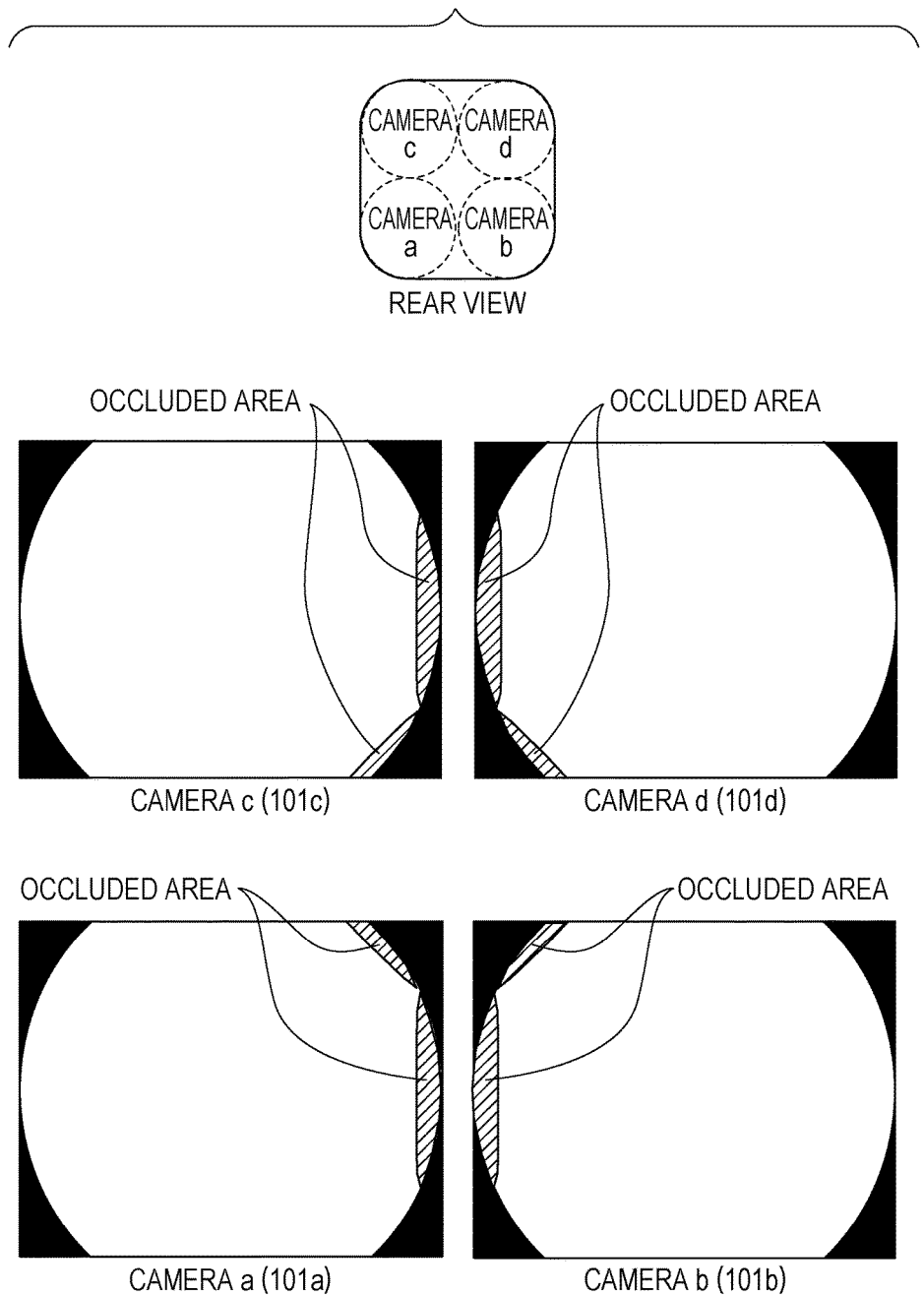
FIG. 7 includes schematic diagrams illustrating examples of occlusion information regarding each camera image in the first embodiment.

Examples of occlusion information regarding the four cameras 101a to 101d are illustrated in FIG. 7. Occlusion information is information that indicates an area in a camera image, in which a lens or a camera body is visible and a subject behind the lens or the camera body is occluded. In this embodiment, occlusion information indicates three areas, that is, a "subject area", an "occluded area", and an "out-of-field-of-view area", each pixel in a camera image belonging to any one of these areas. For example, occlusion information about the pixel coordinates (u, v) in a camera image I is expressed by O(u, v). FIG. 7 includes diagrams in which three states of each pixel are represented such that a subject area is represented in white, an occluded area is shaded, and an out-of-field-of-view area is represented in black. The occlusion information can be prepared in advance in such a way that images are captured by the cameras 101, and an area to which each pixel belongs is manually determined. In this embodiment, the image capturing apparatus 1 generates an image that does not include an occluded area and a three-dimensional position from the camera images that include occluded areas illustrated in FIG. 6B.

Next, in the position calculation step S402, a plurality of camera images captured by the cameras 101a to 101d of the image capturing unit 100 (image data) are obtained. Then, two or more camera images among the plurality of camera images that have been received are used as a set, and a plurality of sets of camera images are prepared. Last, for each set of camera images, the three-dimensional positions of a plurality of points in the camera images are calculated by means of stereo vision using the camera parameters that have been read in the camera parameter reading step S401.

Hereinafter, operations in the position calculation step S402 will be described in detail. It is assumed that four camera images captured by the cameras 101a, 101b, 101c, and 101d are denoted by $I_a$, $I_b$, $I_c$, and $I_d$ respectively. Then, for six sets of images, each set being formed of two camera images, that is, $(I_a, I_b)$, $(I_a, I_c)$, $(I_a, I_d)$, $(I_b, I_c)$, $(I_b, I_d)$, and $(I_c, I_d)$, a plurality of sets of corresponding points in each set of images are detected. A set of corresponding points in each set of images corresponds to points in the two images in the case where a point on a subject that appears in one of the two images also appears in the other image. For example, in the case of the set of camera images $(I_a, I_b)$, for every pixel on the camera image $I_a$, pixel coordinates $(u_{bn}, v_{bn})$ of a corresponding point in the camera image $I_b$, which correspond to the pixel coordinates $(u_{an}, v_{an})$ of that pixel, are detected.

In the case where the pixel coordinates $(u_{an}, v_{an})$ in the image $I_a$ and the pixel coordinates $(u_{bn}, v_{bn})$ in the image $I_b$ are pixel coordinates relating to corresponding points, pixel values $i_a(u_{an}, v_{an})$ and $i_b(u_{bn}, v_{bn})$ of the two points are identical, which is called brightness constraint. A certain one subject occupies a plurality of neighboring pixels in an image, and therefore, it is highly likely that the corresponding point of a pixel that neighbors the pixel corresponding to the pixel coordinates $(u_{an}, v_{an})$ in the image $I_a$ is present near a pixel corresponding to the pixel coordinates $(u_{bn}, v_{bn})$ in the image $I_b$, which is called smoothness constraint. A set of corresponding points in the set of camera images $(I_a, I_b)$ can be obtained by estimating an aggregation of sets of $(u_{an}, v_{an})$ and $(u_{bn}, v_{bn})$ that best satisfy two conditions of brightness constraint and smoothness constraint described above.

A corresponding point search method and a motion estimation method used to calculate corresponding pixel coordinates in two camera images with an accuracy denoted by a real number are described in detail in literature, such as C. Zach, T. Pock, and H. Bischof, "A duality based approach for realtime TV-Li optical flow," In Proceedings of the 29th DAGM conference on Pattern recognition, pp. 214-223, 2007, and M. Werlberger, T. Pock, H. Bischof, "Motion estimation with non-local total variation regularization," IEEE Conference on Computer Vision and Pattern Recognition (CVPR), pp. 2464-2471, 13-18 Jun. 2010, and therefore, detailed description thereof will be omitted here.

Information about a combination of pixel coordinates in the camera image $I_a$, and pixel coordinates in the camera image $I_b$ which correspond to the pixel coordinates in the camera image $I_a$ may be called pixel pair information.

Next, for each set of corresponding points, simultaneous equations (x) are solved by using the coordinates of the set of corresponding points, $(u_{an}, v_{an})$ and $(u_{bn}, v_{bn})$, and an external parameter $M_{b,a}$ and internal parameters $f_a$, $k_a$, $f_b$, and $k_b$ regarding the cameras 101a and 101b, which have been obtained in advance, to thereby calculate the three-dimensional position $(x_{an}, y_{an}, z_{an})$ of the set of corresponding points. It is assumed that the three-dimensional position is represented using coordinate values in the viewpoint coordinate system of the camera 101a.

$$u_a = \frac{1}{k_a} \frac{x_a}{\sqrt{x_a^2 + y_a^2}} f_a \tan^{-1} \frac{\sqrt{x_a^2 + y_a^2}}{z_a} \quad (x)$$

$$v_a = \frac{1}{k_a} \frac{y_a}{\sqrt{x_a^2 + y_a^2}} f_a \tan^{-1} \frac{\sqrt{x_a^2 + y_a^2}}{z_a}$$

$$u_b = \frac{1}{k_b} \frac{x_b}{\sqrt{x_b^2 + y_b^2}} f_b \tan^{-1} \frac{\sqrt{x_b^2 + y_b^2}}{z_b}$$

$$v_b = \frac{1}{k_b} \frac{y_b}{\sqrt{x_b^2 + y_b^2}} f_b \tan^{-1} \frac{\sqrt{x_b^2 + y_b^2}}{z_b}$$

$$\begin{pmatrix} x_a \\ y_a \\ z_a \\ 1 \end{pmatrix} = M_{b,a} \begin{pmatrix} x_b \\ y_b \\ z_b \\ 1 \end{pmatrix}$$

A binocular stereo method used to calculate a three-dimensional position from corresponding points in two camera images and the positions of two cameras, and conversion of coordinate values between two three-dimensional coordinate systems are described in detail in literature, such as Takashi Matsuyama, et al., "Computer Vision", Shin Gijutsu Communications, Co., Ltd., pp. 123-137, and therefore, detailed description thereof will be omitted here.

Furthermore, calculation of the three-dimensional position is similarly performed for the remaining five sets of camera images.

By performing the above-described detailed operations in the position calculation step S402, for each of the six sets of camera images, a plurality of sets of corresponding points in the two camera images are detected and the three-dimensional positions of the plurality of sets of corresponding points are calculated, and the results are outputted as position information. For two camera images $I_q$ and $I_r$ (q and r), an aggregation of pieces of position information $p_{q,r,n}$ about $N_q$ sets of corresponding points in the two camera images $I_q$ and $I_r$, which is denoted by $P_{q,r}$, is expressed by expression (3). Position information about all sets of images is denoted by $\{P_{q,r}\}$.

$$P_{q,r} = \{p_{q,r,n}\}, (n = 1 \ldots N_q) \quad (3)$$

$$= \{(u_{qn}, v_{qn}, u_{rn}, v_{rn}, x_{qn}, y_{qn}, z_{qn})\}$$

Position information may be information that includes pixel pair information (pixel coordinates and corresponding pixel coordinates) specifying two pixels and a three-dimensional position corresponding to the pixel pair specified by the pixel pair information.

Next, in the position selection step S403, the occlusion information read in the camera parameter reading step S401 and $\{P_{q,r}\}$, which is a plurality of sets of position information, calculated in the position calculation step S402 are received, and pieces of position information relating to a subject area are selected from among the pieces of position information about all sets of corresponding points and are outputted as selected position information $\{P'_{q,r}\}$.

Specifically, for the position information $p_{q,r,n}$ about every set of corresponding points which constitutes the position information $\{P_{q,r}\}$, selection processing described below is repeated.

From $p_{a,b,n}$, which is position information about a certain set of corresponding points in a set of two images $I_a$ and $I_b$, coordinate values $(u_{an}, v_{an})$ in the image $I_a$ and coordinate values $(u_{bn}, v_{bn})$ in the image $I_b$ are read. Next, $O_a(u_{an}, v_{an})$ and $O_b(u_{bn}, v_{bn})$, which are occlusion information about the set of corresponding points in the two images, are read from occlusion information $O_a$ regarding the camera image $I_a$ and occlusion information $O_b$ regarding the camera image $I_b$. In the case where both of the two pieces of occlusion information that have been read indicate "subject area", the position information $p_{a,b,n}$ about the set of corresponding points is selected and included in selected position information. On the other hand, in the case where the two pieces of occlusion information indicate "occluded area" or "out-of-field-of-view area", the set of corresponding points is not selected.

The above-described selection operation is repeated for all sets of corresponding points relating to the position information $\{P_{q,r}\}$, and selected position information $\{P'_{q,r}\}$ about all sets of camera images is generated and outputted.

Schematic diagrams indicating a relationship between the position information $\{P_{q,r}\}$ and occlusion information are illustrated in FIG. 8. The six diagrams indicate a relationship between position information calculated from six sets of camera images and occlusion information. For example, the diagram "camera a-b" represents the pixel value of a pixel in the camera a that corresponds to each corresponding point on the basis of position information $P_{a,b}$ calculated from a set of two camera images captured by the camera a and the camera b such that a point included in an "out-of-field-of-view area" is represented in black and, among corresponding points other than the point included in an "out-of-field-of-view area", a point included in an "occluded area" is represented using shading and the remaining points that are included in a "subject area" is represented in white. In FIG. 7, an upper right portion is an occluded area in the camera a and an upper left portion is an occluded area in the camera b. However, regarding position information, a three-dimensional position cannot be measured for both of the occluded area of the camera a and the occluded area of the camera b. Accordingly, in the diagram "camera a-b" in FIG. 8, occluded areas appear in an upper right portion and an upper left portion. Although the set of cameras a and b has occluded areas in an upper right portion and an upper left portion, other sets of cameras have occluded areas in different portions. For example, an upper left portion is not an occluded area in the diagram "camera a-c", and an upper right portion is not an occluded area in the diagram "camera b-d" in FIG. 8. Accordingly, position information without information relating to an occluded area can be obtained by selecting and collecting subject areas that are not occluded, that is, white areas in FIG. 7, from position information calculated from a plurality of sets of camera images. The result obtained by collecting unoccluded areas (white areas) on the basis of the idea described above corresponds to selected position information $\{P'_{q,r}\}$ selected in the position selection step S403.

Selected position information may be generated from a plurality of pieces of position information while certain pieces of position information are excluded, the certain pieces of position information may each include certain pixel pair information, and at least either of the pixels specified by the certain pixel pair information may be included in an occluded area.

Next, in the image complementing step S404, the plurality of images captured by the cameras 101a to 101d of the image capturing unit 100, the occlusion information, internal parameters regarding the cameras, and external parameters regarding the cameras read in the camera parameter reading step S401, and the selected position information generated in the position selection step S403 are received, a complementary image is generated by replacing the pixel values of pixels in an occluded area in an image with the values based on the pixel values of pixels in the other images on the basis of the selected position information, and the complementary image and the selected position information are outputted.

Hereinafter, operations in the image complementing step S404 will be described in detail. In this embodiment, a case will be described where the pixel values of pixels in an occluded area in the image I, are complemented by using the other three images $I_b$, $I_c$, and $I_d$ and the selected position information.

In the image complementing step S404, for every set of corresponding points relating to position information $p'_{q,r,n}$ in the selected position information $\{P'_{q,r}\}$, pixel coordinates $(u_a, v_a)$ in the image $I_a$ are first calculated. A method of calculating pixel coordinates in the image $I_a$ is as follows. A three-dimensional position $(x_a, y_a, z_a)$ in the coordinate system of the camera a is calculated by using a three-dimensional position $(x_q, y_q, z_q)$ in the coordinate system of the camera q included in the position information $p'_{q,r,n}$ and an external parameter $M_{qa}$ regarding the camera q and the camera a. Then, pixel coordinates $(u_a, v_a)$ in the camera a are calculated by using the three-dimensional position $(x_a, y_a, z_a)$ and the internal parameter $(f, k)$ regarding the camera a (expression (4)).

$$u_a = \frac{1}{k} \frac{x_a}{\sqrt{x_a^2 + y_a^2}} f \tan^{-1}\left(\frac{\sqrt{x_a^2 + y_a^2}}{z_a}\right) \quad (4)$$

$$v_a = \frac{1}{k} \frac{y_a}{\sqrt{x_a^2 + y_a^2}} f \tan^{-1}\left(\frac{\sqrt{x_a^2 + y_a^2}}{z_a}\right)$$

$$\begin{pmatrix} x_a \\ y_a \\ z_a \\ 1 \end{pmatrix} = M_{qa} \begin{pmatrix} x_q \\ y_q \\ z_q \\ 1 \end{pmatrix}$$

Next, in the image complementing step S404, coordinates $(u, v)$ of a pixel among all pixels in the image $I_a$, occlusion information $O_a(u, v)$ of which indicates "occluded area", is extracted. Such a pixel is called an occluded pixel and is represented by $o_{aj}=(u_{aj}, v_{aj})$. Next, for each occluded pixel, position information about a corresponding point that is closest to the occluded pixel is selected from among all pieces of position information $p'_{q,r,n}$ in the selected position information $\{P'_{q,r}\}$ that has been obtained, on the basis of the distance between the pixel coordinates $(u_a, v_a)$ corresponding to the corresponding point in the camera a and the pixel coordinates $(u_{aj}, v_{aj})$ of the occluded pixel. Then, a pixel value is calculated from a pixel value $i_q(u_{qn}, v_{qn})$ relating to the selected corresponding point in the image q and a pixel value $i_r(u_{rn}, v_{rn})$ relating to the selected corresponding point in the image r, and the calculated pixel value is set as a pixel value of the occluded pixel at the coordinates $(u_{aj}, v_{aj})$ in the image $I_a$. It is assumed that, as a method of calculating one pixel value from the pixel value $i_q(u_{qn}, v_{qn})$ relating to the corresponding point in the image q and the pixel value $i_r(u_{rn}, v_{rn})$ relating to the corresponding point in the image r, a method of using an average pixel value is employed here. The processing described above is repeated for all occluded pixels to thereby set new pixel values for all pixels in an occluded area in the image $I_a$.

A complementary image is generated by performing the above-described detailed operations in the image complementing step S404. Note that the pixel values of pixels not included in an occluded area may be used without change.

Figure 9A:
FIG. 9A illustrates an example of a complementary image.
Figure 9B:
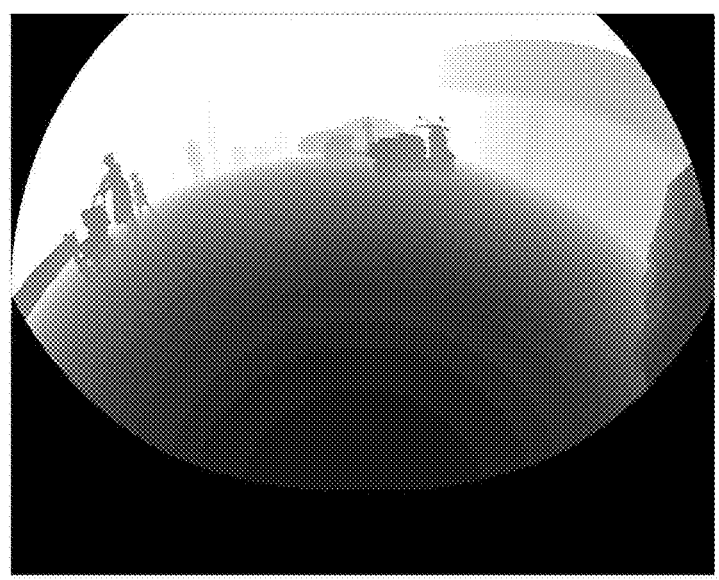
FIG. 9B illustrates an example of selected position information in the first exemplary embodiment of the present disclosure.

FIG. 9A illustrates an example of a complementary image, and FIG. 9B illustrates an example of selected position information. FIG. 9A illustrates an image generated by replacing an occluded area (an area occluded by an adjacent lens, for example) in the camera image "camera a" in FIG. 6B using the pixel values of pixels in the other images in accordance with selected position information. In the camera image "camera a" in FIG. 6B, most part of a vehicle at the right edge is occluded while the vehicle is not occluded in FIG. 9A. FIG. 9B is a diagram that is represented as a gray image and is obtained by calculating the values of pixel coordinates in the image Ia and brightness values, each brightness value being proportional to the distance between the point involved and the camera a, from the three-dimensional position of each set of corresponding points in the selected position information $\{p'_{q,r}\}$.

Last, in the obstacle detection step S405, the complementary image and the selected position information are received, an obstacle is detected on the basis of the selected position information, a frame that indicates an attention area is superimposed and combined on an area in the complementary image which corresponds to the position of the detected obstacle, and the result is outputted as a composite image.

In this embodiment, as a method of detecting an obstacle on the basis of selected position information, a method is employed in which, in the case where a distance d between the three-dimensional position $(x_a, y_a, z_a)$ of each set of corresponding points in selected position information and the camera a is less than a predetermined distance $d_{th}$, the point involved is detected as a point on an obstacle. Furthermore, a rectangle that circumscribes an aggregation of points detected as points on an obstacle is superimposed on the complementary image, and the result is outputted as a composite image, and the composite image is displayed on the display 130.

By the above-described operations in steps S401 to S405 performed by the computer 300, the image processing unit 110 generates one complementary image and selected position information and the obstacle detection unit 120 generates and outputs one composite image, from four camera images captured by the image capturing unit 100. The image capturing unit 100 and the computer 300 may repeatedly perform the above-described operations.

Figure 10:
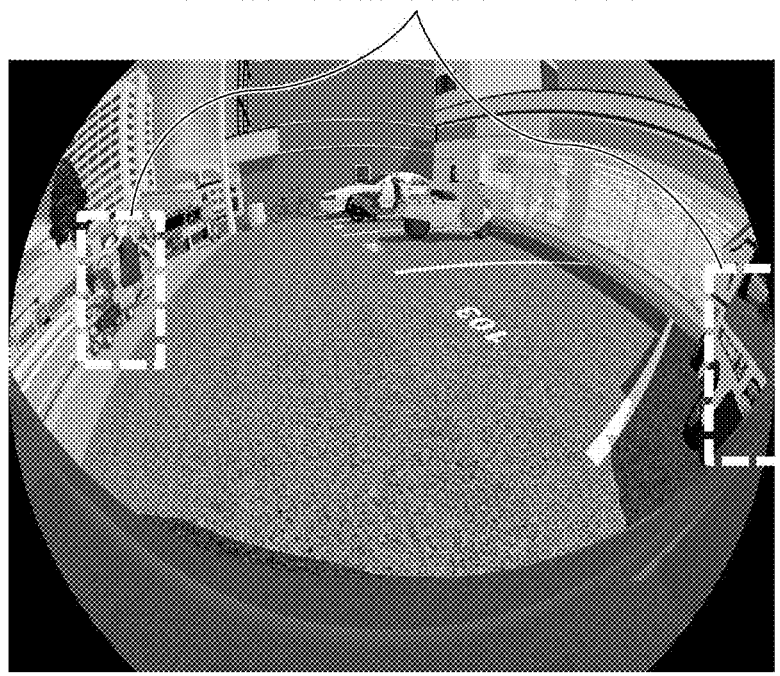
FIG. 10 illustrates an example of a composite image outputted from an obstacle detection unit in the first embodiment.

An example of a composite image generated in the obstacle detection step S405 is illustrated in FIG. 10. In FIG. 10, frames that call attention to obstacles that are present behind the vehicle in a place near the cameras (in this example, a pedestrian and a stopped vehicle) are displayed, and therefore, a driver can easily be aware of the presence of obstacles that the vehicle could come in contact with. In particular, for an area, an image of which and a three-dimensional position cannot be obtained in a three-dimensional position calculation method using fish-eye cameras according to the related art because of occlusion by the camera body, the image capturing apparatus 1 in this embodiment can obtain an image without occlusion in the field of view of 180°, and a three-dimensional position. For example, part of the area of a vehicle on the right side in the image "camera a" in FIG. 6B is occluded by a lens. However, the image capturing apparatus 1 can obtain an image without an occluded area in the field of view of 180° as illustrated in FIG. 9A, and a three-dimensional position. Furthermore, the image capturing apparatus 1 can display a composite image without an occluded area as illustrated in FIG. 10.

Consequently, effects specific to the present disclosure can be attained as described below.

By operations performed by the image capturing unit 100 of the image capturing apparatus 1 and the image processing unit 110 implemented by the computer 300, a three-dimensional position is calculated from camera images captured by the four cameras 101 including fish-eye lenses having a viewing angle of approximately 180°, selected position information is generated by selecting position information relating to an area that is not included in an occluded area using occlusion information obtained in advance, and an occlusion in an image caused by a lens or a camera body is complemented. As a result, an image that does not include an occluded area and that is obtained using a viewing angle of approximately 180°, and a three-dimensional position, that is, a complementary image and selected position information, can be obtained.

Furthermore, by operations performed by the obstacle detection unit 120 and the display 130, the obstacle detection unit 120 can detect and display an obstacle in the field of view of 180°. Therefore, a user of a vehicle-mounted camera system equipped with the image capturing apparatus 1 according to this embodiment can easily be aware of an obstacle.

Note that, in this embodiment, it is assumed that the image capturing unit 100 is constituted by the four cameras 101a to 101d, however, the number of cameras is not limited to four. In order to complement an occlusion that is included in an image captured by a camera and is caused by other cameras, it is sufficient to use at least three cameras, and the number of cameras may be any number as long as the number of cameras is three or more.

In this embodiment, in the case where the pixel value of a pixel included in one camera among the plurality of cameras 101 included in the image capturing apparatus 1 indicates a value obtained by capturing part of the one camera, the pixel may be assumed to be included in an occluded area.

In this embodiment, it is assumed that a plurality of sets of camera images are received and operations in steps S402 to S404 are sequentially performed. However, the amount of data processed in steps S402 to S404 at a time is not limited to sets of camera images. Operations in steps S402 to S404 may be repeated for each partial area in a camera image or for each pixel.

In this embodiment, it is assumed that, in the image complementing step S404, as a method of complementing the pixel value of a pixel included in an occluded area using the pixel value of a pixel on other images, a method is used in which the pixel value of a pixel corresponding to a corresponding point that is nearest to the pixel included in an occluded area is used, however, a method of complementing is not limited to this. Any method may be used as long as the pixel value is set on the basis of the pixel value of a pixel on an image which is not included in an occluded area, using information about corresponding points which is included in selected position information. For example, a method may be used in which weighted addition is performed by referring to a plurality of pixels on an image which are not included in an occluded area and the pixel values of the pixels, on the basis of a plurality of corresponding points located within a certain distance from a pixel in an occluded area.

In this embodiment, a procedure is assumed in which three-dimensional positions are calculated by detecting corresponding points for a plurality of pixels in the position calculation step S402 and thereafter pixels that are not included in an occluded area are selected from among the plurality of pixels in the position selection step S403. However, a procedure for selecting pixels that are not included in an occluded area is not limited to the above-described procedure. Any procedure may be performed as long as pixels that are not included in an occluded area can be selected as a result of the procedure. For example, instead of the procedure in which position coordinates of pixels are calculated and thereafter pixels that are not included in an occluded area are selected, a procedure may be performed in which pixels that are not included in an occluded area are selected using occlusion information and thereafter detection of a corresponding point and calculation of the three-dimensional position are performed for each selected pixel. In this procedure, the number of pixels for each of which detection of a corresponding point and calculation of the three-dimensional position are performed is smaller than the procedure that has been described in this embodiment, and therefore, this procedure is effective in reducing computational load.

Second Embodiment

In this embodiment, an image capturing apparatus will be described, which is configured so as to reduce the impact of an error in disparity estimation (detection of corresponding points) and to reduce errors in three-dimensional positions included in selected position information. The configuration of an image capturing apparatus in this embodiment is similar to the configuration of the image capturing apparatus 1 described in the first embodiment. Therefore, this embodiment will also be described with reference to the configuration of the image capturing apparatus 1 illustrated in FIGS. 1A, 2A, 2B, and 3.

The image capturing apparatus 1 in the first embodiment is configured such that the plurality of cameras 101 of the image capturing unit 100 are arranged close to one another as illustrated in FIG. 2A or 2B in order to reduce errors or mistakes in disparity estimation due to a distortion of a subject image caused by a fish-eye lens.

In the image capturing apparatus 1 having such a configuration, it is expected that an error or a mistake in disparity estimation caused by a distortion of a subject image is sufficiently small because, under a condition that the subject is located a certain distance or more from the image capturing unit 100, the disparity is smaller than a certain level, and differences in the size, shape, and orientation of subject images between the two images are small. For example, under an image capturing condition such that the baseline length between the two cameras 101 is 0.015 m in the image capturing unit 100 and the subject is located 1 m or more from the image capturing unit 100, the disparity (angle difference) is 0.85° at the maximum. In this case, a difference in a distortion between two images becomes small as illustrated in FIG. 6B, and therefore, it is expected that an error or a mistake in disparity estimation caused by a distortion of a subject image is sufficiently small.

Under the image capturing condition described above, an error in a disparity is mainly caused by a noise of a pixel value or a quantization error in pixel coordinates. The degree of an error in disparity estimation caused by a noise or a quantization error is assumed to be constant. Therefore, a three-dimensional position calculated from a disparity has a smaller error as the absolute value of the disparity increases. Accordingly, in this embodiment, an image capturing apparatus increases a weighted value for position information about a corresponding point having a larger disparity than position information about a corresponding point having a smaller disparity among position information about a plurality of corresponding points in the vicinity of a certain point to thereby reduce an error in a three-dimensional position. In doing so, the image capturing apparatus generates selected position information with a smaller error in a three-dimensional position.

A difference between the image capturing apparatus in this embodiment and the image capturing apparatus 1 described in the first embodiment is operations in a position selection step S403' (performed by the position selection unit 112), and other configurations and operations are the same as the first embodiment.

Figure 11:
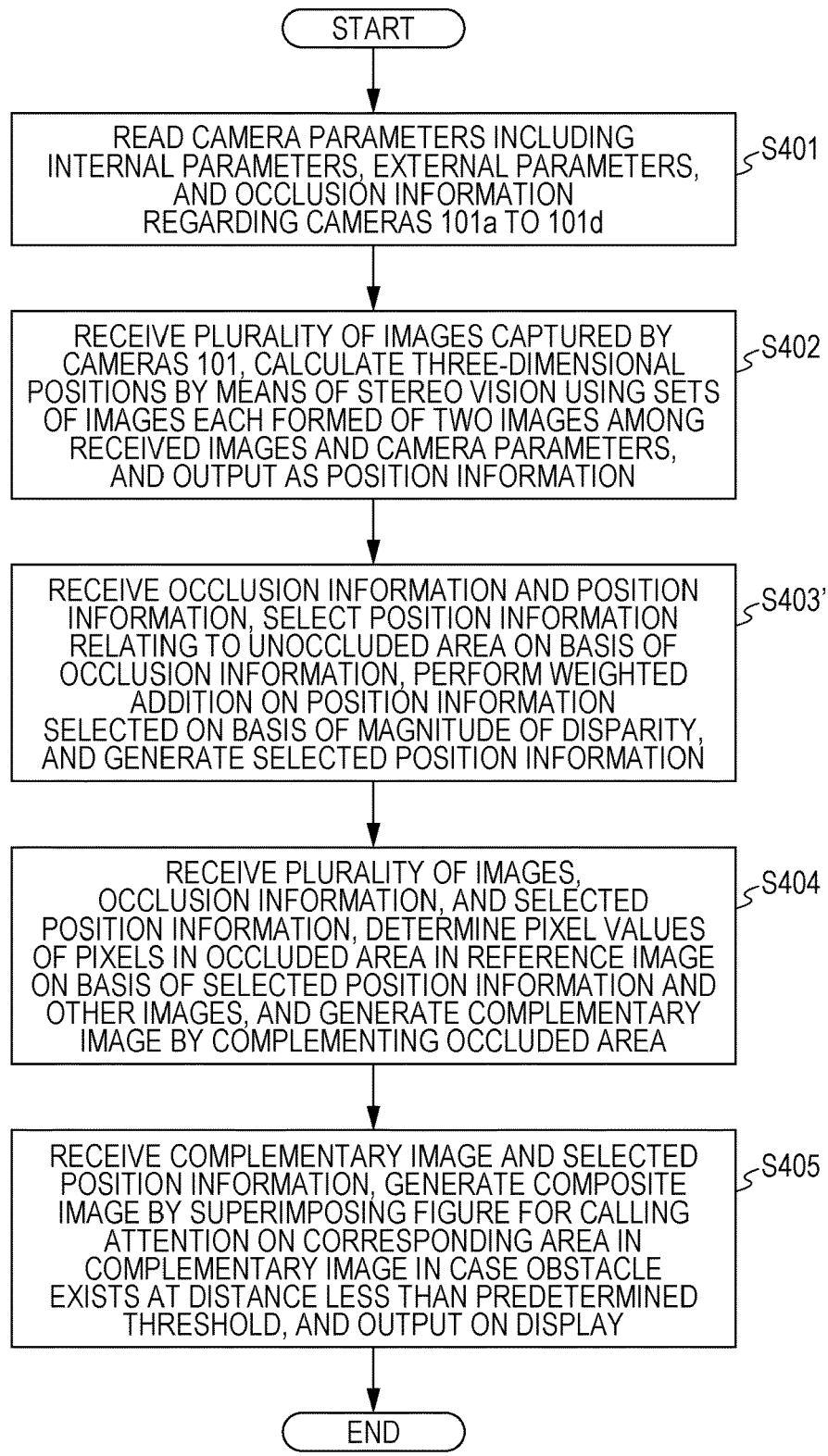
FIG. 11 is a flowchart illustrating a procedure of operations performed by an image capturing apparatus according to a second embodiment.

Hereinafter, operations performed by an image capturing apparatus 2 in this embodiment will be described with reference to FIG. 11.

In the camera parameter reading step S401, information is read and outputted at the time of performing operations, the information being the camera parameters that include the internal parameters, external parameters, and occlusion information regarding the cameras 101a to 101d and that have been stored in advance.

In the position calculation step S402, a plurality of images captured by the image capturing unit 100 are received, a plurality of sets of corresponding points are detected for each set of images, the set being formed by two images, and the three-dimensional positions of the sets of corresponding points are calculated by means of stereo vision using the camera parameters read in the camera parameter reading step S401.

Operations in the camera parameter reading step S401 and in the position calculation step S402 described above are the same as the first embodiment, and therefore, detailed description thereof will be omitted here.

In the position selection step S403', the position selection unit 112 receives the occlusion information read in the camera parameter reading step S401 and the pieces of position information calculated in the position calculation step S402, selects pieces of position information about sets of corresponding points included in a subject area that is not occluded from among pieces of position information about all sets of corresponding points, performs weighted addition on the basis of the magnitude of the disparity for each of the selected pieces of position information, and outputs the result as selected position information.

Hereinafter, operations in the position selection step S403' will be described in detail.

First, in the position selection step S403', tentative selected position information $\{P'_{q,r}\}$ is generated from position information about all sets of images $\{P_{q,r}\}$ by the same operations performed by the position selection unit 112 in the first embodiment. Specifically, coordinate values ($u_{an}$, $v_{an}$) in the image $I_a$ and coordinate values ($u_{bn}$, $v_{bn}$) in the image $I_b$ are read from the position information $p_{a,b,n}$ about a set of corresponding point. Then, occlusion information $O_a(u_{an}, v_{an})$ and $O_b(u_{bn}, v_{bn})$ about the set of corresponding points in the two images are read from occlusion information $O_a$ regarding the camera image $I_a$ and occlusion information $O_b$ regarding the camera image $I_b$. In the case where both of the two pieces of occlusion information that have been read indicate "subject area", the position information $p_{a,b,n}$ is selected and included in the tentative selected position information $\{P'_{q,r}\}$. On the other hand, in the case where the two pieces of occlusion information indicate "occluded area" or "out-of-field-of-view area", the set of corresponding points is not selected. Such a selection operation is repeated for all sets of corresponding points relating to the position information $\{P_{q,r}\}$, and tentative selected position information $\{P'_{q,r}\}$ about all sets of images is generated.

Next, in the position selection step S403', a plurality of sets of corresponding points which are close to one another are extracted from among sets of corresponding points relating to the tentative selected position information $\{P'_{q,r}\}$, position information is calculated while weighted addition is performed on each of the pieces of position information about the plurality of sets of corresponding points that have been extracted, on the basis of the magnitude of the disparity, and the original pieces of position information about the plurality of sets of corresponding points are replaced with the calculation result to thereby generate and output selected position information $\{P''_{q,r}\}$. Here, for all sets of corresponding points, pixel coordinates $(u_a, v_a)$ in the camera image $I_a$ are calculated using expression (4), and furthermore the nearest integer pixel coordinates $(u_{ai}, v_{ai})$ are calculated. Then, pieces of position information about M corresponding points $p'_{a,q,m}$, integer pixel coordinates of which in the camera a are the same, are extracted. From the extracted pieces of position information about the M corresponding points, three-dimensional coordinate values $(x_a', y_a', z_a')$ are calculated while weighted addition is performed on $(x_{am}, y_{am}, z_{am})$, which is the three-dimensional position of each corresponding point in the camera a, in accordance with $d_m$, which is the magnitude of the disparity of each corresponding point, and the result is used as new selected position information $p''_{a,s}$ (expression (5)).

$$p''_{a,s} = (u_{ai}, v_{ai}, u_s, v_s, x_a', y_a', z_a') \quad (5)$$

$$x_a' = \sum_m w_m x_{am}, \quad y_a' = \sum_m w_m x_{am}, \quad z_a' = \sum_m w_m x_{am}$$

$$w_m = \frac{d_m}{\sum d_m}$$

$$d_m = \sqrt{(u_{am} - u_{qm})^2 + (v_{am} - v_{qm})^2}$$

$$p'_{a,q,m} = (u_{am}, v_{am}, u_{qm}, v_{qm}, x_{am}, y_{am}, z_{am}), (m = 1 \ldots M)$$

Regarding the selected position information $p''_{a,s}$, an image that is to form a set with the camera image $I_a$ is an image $I_s$ that includes a corresponding point, the disparity of which is the largest, among the extracted M corresponding points, and pixel coordinates $(u_s, v_s)$ in the image $I_s$ are selected. The pixel coordinates $(u_s, v_s)$ are calculated by projection of the three-dimensional coordinates $(x_a', y_a', z_a')$ in the camera a onto the pixel coordinates of the camera s similarly to expression (4).

Last, the original pieces of position information about the plurality of sets of corresponding points are replaced with the selected position information $p''_{a,s}$ that has been calculated to thereby generate selected position information $\{P''_{a,s}\}$.

FIG. 12 includes examples of the distributions of the magnitude of the disparity in respective sets of images. The four diagrams in FIG. 12 are diagrams that represent the magnitude of the disparity for a point that is located a certain distance (1 m) from the cameras, that is, the distance between the corresponding points, in six sets of images with gray images. The inside of a circle that is in contact with the right and left edges of each image corresponds to the field of view of 180°. On the other hand, the outside of the circle corresponds to an out-of-field-of-view area, an image of which cannot be captured because the area is out of the field of view, and is represented in black. It is found from FIG. 12 that the magnitude of the disparity differs depending on the position in the image, in the field of view of one set of images. For example, the diagram "camera a-b, c-d" in FIG. 12 is a diagram illustrating an example of the disparity relating to the set of the cameras a and b, and the disparity is large in upper and lower portions in the field of view (represented in white) while the disparity is small in left and right portions in the field of view (represented in black). In particular, the black areas on the left and right sides are areas where the disparity is close to 0, and a three-dimensional position calculated from such a disparity that is close to 0 may have a large error. On the other hand, in different sets of cameras, the magnitude of the disparity largely differs depending on the set of cameras even in the same position. For example, the diagram "camera a-c, b-d" in FIG. 12 is a diagram illustrating an example of the disparity relating to the set of the cameras a and c, and the disparity is large in left and right portions in the field of view (represented in white) while the disparity is small in upper and lower portions in the field of view (represented in black), which shows a trend opposite to the set of the cameras a and b. Accordingly, by generating position information so as to increase a weighted value for position information about a corresponding point having a large disparity on the basis of a plurality of sets of cameras, it is expected that an error in a three-dimensional position can be reduced.

In the image complementing step S404, the selected position information $\{P''_{a,s}\}$ generated in the position selection step S403', the plurality of images outputted from the image capturing unit 100, and the occlusion information, internal parameters regarding the cameras, and the external parameters regarding the cameras read in the camera parameter reading step S401 are received, a complementary image is generated by replacing the pixel values of pixels in an occluded area in an image with the pixel values of pixels in the other images on the basis of the selected position information, and the complementary image and the selected position information are outputted.

In the obstacle detection step S405, the complementary image and the selected position information are received, an obstacle is detected on the basis of the selected position information, a frame indicating an attention area is superimposed and combined on an area in the complementary image which corresponds to the position of the detected obstacle, and the result is outputted as a composite image.

Operations in the image complementing step S404 and in the obstacle detection step S405 described above are the same as the image complementing step S404 performed by the image complementing unit 113 and the obstacle detection step S405 performed by the obstacle detection unit 120 in the first embodiment, and therefore, detailed description thereof will be omitted here.

As described above, as a result of operations performed by the image capturing unit 100 and the image processing unit 110 implemented by the computer 300 of the image capturing apparatus 2 of this embodiment, an image obtained using a viewing angle of approximately 180° without occlusion and a three-dimensional position can be obtained similarly to the image capturing apparatus 1 in the first embodiment. Furthermore, the image capturing apparatus 2 of this embodiment generates selected position information by selecting a piece of position information relating to an area that is not occluded and to a set of corresponding points having a large disparity from among pieces of position information about a plurality of sets of corresponding points. An error in a three-dimensional position caused by a noise or a quantization error becomes smaller as the disparity increases. Therefore, by selecting position information about a set of corresponding points having a large disparity, an effect is attained such that selected position information that includes a three-dimensional position having a smaller error can be obtained.

Note that, the image capturing apparatus 2 of this embodiment calculates position information from pieces of position information about a plurality of sets of corresponding points while increasing a weighted value for a piece of position information about a set of corresponding points having a large disparity to thereby generate selected position information that includes a three-dimensional position having a smaller error and reduce an error in a three-dimensional position. This method is effective in the case where it is supposed that the disparity is small and an error or a mistake in disparity estimation caused by a distortion of a subject image is sufficiently small, such as in the case where the subject is located a certain distance or more from the image capturing unit 100. However, in the case where the distance between the subject and the image capturing unit 100 is short and an error or a mistake in disparity estimation caused by a distortion of a subject image cannot be ignored, an error in the three-dimensional position is large. In such a case, the position selection step S403' is configured not to perform weighted addition processing in accordance with the magnitude of the disparity on a set of corresponding points in the case where the disparity of the set of corresponding points is equal to or larger than a predetermined threshold, thereby attaining an effect such that an error in estimation of a three-dimensional position is reduced.

Similarly, in the case where the distance between the subject and the image capturing unit 100 is short and an error in disparity estimation caused by a distortion of the subject image is too large to ignore, weighted addition may be performed in accordance with the magnitude of the disparity in a tangential direction instead of weighted addition in accordance with the magnitude of the disparity in the position selection step S403'.

The reason will be described below. In an image captured by a fish-eye lens, the shape, size, and orientation of a subject image differs depending on the position in the image as described above. In particular, in the case of fish-eye lenses, a distortion of a subject image differs depending on whether the disparity is in a radial direction or in a tangential direction even if the magnitude of the disparity is the same. Specifically, fish-eye lenses have characteristics such that, in the case where a disparity exists in a radial direction, the shapes and sizes of subject images mainly differ, whereas in the case where a disparity exists in a tangential direction, the orientations of subject images mainly differ, while the shapes and sizes of subject images remain about the same. On the other hand, the corresponding point detection method described above has a tendency that more errors or mistakes occur due to a difference in the shape rather than a difference in the size or orientation.

Accordingly, in the position selection step S403' in this embodiment, a weighted value based on the magnitude of the disparity in a tangential direction $d_{tm}$ and the magnitude of the disparity in a radial direction $d_{rm}$ (expression (6)) is used instead of calculating a three-dimensional position while performing weighted addition in accordance with the magnitude of the disparity $d_m$ (expression (5)) to thereby attain an effect such that an error in the three-dimensional position caused by a noise or a quantization error can be reduced and furthermore an error in disparity estimation caused by a distortion of a subject image and an error in the three-dimensional position can also be reduced.

$$w_m = \frac{d'_m}{\sum d'_m} \quad (6)$$

$$d'_m = d_{tm} + \frac{c_{tr}}{d_{rm}}$$

$$d_{tm} = \left| \tan^{-1} \frac{v_{am} - v_c}{u_{am} - u_c} - \tan^{-1} \frac{v_{qm} - v_c}{u_{qm} - u_c} \right|$$

$$d_{rm} = \left| \sqrt{(u_{am} - u_c)^2 + (v_{am} - v_c)^2} - \sqrt{(u_{qm} - u_c)^2 + (v_{qm} + -v_c)^2} \right|$$

In expression 6, $c_{tr}$ is a coefficient that adjusts a weighted value for the disparities in a radial direction and in a tangential direction, and $(u_c, v_c)$ is pixel coordinates of the optical axis center.

The position selection unit 112 may perform weighted addition on the basis of the magnitude of the disparity for a selected piece of position information while increasing the weighted value as the component of the disparity in a tangential direction increases and the component of the disparity in a radial direction decreases, and may generate selected position information.

Note that, in the first and second embodiments, an example of a case has been described in which the image capturing unit 100 is installed in the rear of a vehicle and image of an area behind the vehicle and a three-dimensional position are obtained, however, a place where the cameras are installed or the direction or scope in which images are captured is not limited to such a case and the cameras may be installed in any direction.

In the case of a vehicle, a mobile robot, or a building, for example, a place where the image capturing apparatus can be installed is limited and there is also a restriction in terms of an external appearance (design). Therefore, it is desirable that the apparatus be made smaller as much as possible and the number of the apparatuses be also made smaller as much as possible. Accordingly, it is desirable that one image capturing apparatus can obtain images and the three-dimensional position of a wider area as much as possible.

The image capturing apparatus according to examples of the present disclosure has a viewing angle wider than that of image capturing apparatuses according to the related art. In the case where the image capturing apparatus according to the present disclosure is used in a safe driving assistance system, a mobile robot, or a monitoring camera system, for example, indirect and secondary effects are attained as follows. That is, there is a case where a vehicle body, a robot body, or a building has a flat surface, and an image of three-dimensional space that extends along the flat surface and a three-dimensional position need to be obtained. For example, there is a case where an obstacle in three-dimensional space that extends along a rear surface or a side surface of a vehicle body is to be sensed, or a trespasser in space that extends along a wall surface of a building is to be detected. In such a case, in order to capture an image of space that extends along the flat surface, two image capturing apparatuses are needed if the image capturing apparatuses have a viewing angle of less than 180°. On the other hand, an image and a three-dimensional position can be obtained without occlusion by installing one image capturing apparatus according to the present disclosure on a flat surface such that the optical axes of the cameras are parallel to a direction normal to the flat surface. In other words, in the case of using the image capturing apparatus according to the present disclosure, an effect is attained such that the number of image capturing apparatuses can be substantially reduced.

In the embodiments described above, description has been given while it is assumed that the image capturing apparatus may include at least the image capturing unit 100 and the image processing unit 110. As a modification, the present disclosure may be implemented as an image processing apparatus that does not include the image capturing unit 100 but includes the image processing unit 110 as a main unit, or the image processing unit 110 may be implemented as an image processing apparatus or an image processing circuit. In this case, the image capturing unit 100 may be provided as an external constituent element of the image processing apparatus. Images captured by the image capturing unit 100 may be stored in a storage apparatus, such as an HDD, which is not illustrated, and may be transmitted to the image processing apparatus including the image processing unit 110, with wires or wirelessly. Note that the obstacle detection unit 120 and the display 130 may be apparatuses (for example, a PC and a display of the PC) provided outside the image capturing apparatus as described above. The image processing apparatus or the image processing circuit described above can be operated when a computer program is executed.

INDUSTRIAL APPLICABILITY

The image capturing apparatus according to the present disclosure uses a plurality of cameras each having a field of view of approximately equal to or larger than 180°, and is preferably used in measurement of a subject and the three-dimensional position of the subject, that is, the image capturing apparatus according to the present disclosure is preferably used as a vehicle-mounted camera for vehicles and as a monitoring camera.

What is claimed is:

1. An image capturing apparatus comprising:
at least three cameras configured to capture a plurality of images, each of the cameras having a viewing angle that is approximately equal to or larger than 180°, the cameras being integrally fixed to one another to form an image capturing device such that (i) that optical axes of the cameras are substantially parallel to one another and (ii) each of the plurality of images includes occluded areas, each of the occluded areas being an area of an image captured by one of the cameras in which a part of an adjacent one of the cameras is visible and an area behind the part of the adjacent one of the cameras is not visible;
a non-transitory memory configured to store in advance camera parameters including external parameters regarding physical arrangement of the cameras, internal parameters regarding characteristics of the cameras, and occlusion information that indicates whether or not each pixel of the plurality of images belongs to one of the occluded areas; and
a processor configured to (i) calculate three dimensional positions of a plurality of points based on the plurality of images and the camera parameters and (ii) output pieces of position information, including the three dimensional positions, about the plurality of points,
wherein the plurality of points includes a point,
wherein the at least three cameras includes a first camera, a second camera, and a third camera,
wherein the plurality of images includes a first image including an image of the point, a second image including an image of the point, and a third image not including an image of the point,
wherein the first camera captures the first image, the second camera captures the second image, and the third camera captures the third image,
wherein the first image has a first pixel having a first pixel value at first coordinates and the second image has a second pixel having a second pixel value at second coordinates,
wherein the three dimensional positions of the plurality of points includes three dimensional coordinates of the point based on the first pixel and the second pixel,
wherein the processor is further configured to (i) based on the pieces of position information and the occlusion information, select a piece of position information relating to a subject area that does not have an occlusion from among the pieces of position information and (ii) output the selected piece of position information as selected position information,
wherein the processor is further configured to (i) based on the plurality of images and the selected position information, generate a complementary image by complementing an occluded area included in one of the plurality of images and included in the occluded areas and (ii) output the complementary image and the selected position information,
wherein the complementary image includes a first complementary image of the point, the first complementary image being included in the third image,
wherein the first complementary image is provided at a pixel having a third pixel value at third coordinates,
wherein the third coordinates are provided based on the three dimensional coordinates of the point and the camera parameters,
wherein the third pixel value is provided based on the first pixel value and the second pixel value,
wherein the processor is further configured to (i) detect an obstacle on the basis of the selected position information, (ii) superimpose an attention area on an area of the complementary image corresponding to a position of the detected obstacle to generate a composite image, and (iii) output the composite image, and
wherein the output composite image is displayed on a display.

2. The image capturing apparatus according to claim 1, wherein
a distance between optical axis centers of two adjacent cameras among the cameras is smaller than the sum of diameters of lenses of the two adjacent cameras.

3. The image capturing apparatus according to claim 2, wherein
the distance between the optical axis centers of the two adjacent cameras is approximately equal to an average diameter of the lenses of the two adjacent cameras.

4. The image capturing apparatus according to claim 1, wherein
the processor selects a piece of position information relating to an area that is not occluded from among the pieces of information about the plurality of points on the basis of the occlusion information, performs weighted addition on the selected piece of position information on the basis of a magnitude of a disparity, and generates the selected position information.

5. The image capturing apparatus according to claim 4, wherein
the processor performs weighted addition on the selected piece of position information on the basis of the magnitude of the disparity while increasing a weighted value in a case where the selected piece of position information relates to a large disparity, and generates the selected position information.

6. The image capturing apparatus according to claim 4, wherein
the processor performs weighted addition on the selected piece of position information on the basis of a component of the disparity in a radial direction and a component of the disparity in a tangential direction, and generates the selected position information.

7. The image capturing apparatus according to claim 6, wherein
the processor performs weighted addition on the selected piece of position information on the basis of the magnitude of the disparity while increasing the weighted value as the component of the disparity in the tangential direction increases and the component of the disparity in the radial direction decreases, and generates the selected position information.

8. The image capturing apparatus according to claim 1, wherein
in a case where space, an image of which and a three-dimensional position in which are to be obtained, is three-dimensional space that extends along a flat surface, the image capturing apparatus is arranged such that the optical axes of the cameras are substantially parallel to a direction normal to the flat surface.

9. A monitoring system comprising:
the image capturing apparatus according to claim 1; and
the display which is configured to display the output composite image.

10. An image processing apparatus comprising:
a non-transitory memory configured to store in advance camera parameters including (i) external parameters regarding physical arrangement of at least three cameras configured to capture a plurality of images, each of the cameras having a viewing angle that is approximately equal to or larger than 180°, the cameras being integrally fixed to one another to form an image capturing device such that that optical axes of the cameras are substantially parallel to one another and each of the plurality of images includes occluded areas, each of the occluded areas being an area of an image captured by one of the cameras in which a part of an adjacent one of the cameras is visible and an area behind the part of the adjacent one of the cameras is not visible, (ii) internal parameters regarding characteristics of the cameras, and (iii) occlusion information that indicates whether or not each pixel of the plurality of images belongs to one of the occluded areas; and
a processor configured to (i) calculate three dimensional positions of a plurality of points based on the plurality of images and the camera parameters and (ii) output pieces of position information, including the three dimensional positions, about the plurality of points,
wherein the plurality of points includes a point,
wherein the at least three cameras includes a first camera, a second camera, and a third camera,
wherein the plurality of images includes a first image including an image of the point, a second image including an image of the point, and a third image not including an image of the point,
wherein the first camera captures the first image, the second camera captures the second image, and the third camera captures the third image,
wherein the first image has a first pixel having a first pixel value at first coordinates and the second image has a second pixel having a second pixel value at second coordinates,
wherein the three dimensional positions of the plurality of points includes three dimensional coordinates of the point based on the first pixel and the second pixel,
wherein the processor is further configured to (i) based on the pieces of position information and the occlusion information, select a piece of position information relating to a subject area that does not have an occlusion from among the pieces of position information and (ii) output the selected piece of position information as selected position information,
wherein the processor is further configured to (i) based on the plurality of images and the selected position information, generate a complementary image by complementing an occluded area included in one of the plurality of images and included in the occluded areas and (ii) output the complementary image and the selected position information,
wherein the complementary image includes a first complementary image of the point, the first complementary image being included in the third image,
wherein the first complementary image is provided at a pixel having a third pixel value at third coordinates,
wherein the third coordinates are provided based on the three dimensional coordinates of the point and the camera parameters,
wherein the third pixel value is provided based on the first pixel value and the second pixel value,
wherein the processor is further configured to (i) detect an obstacle on the basis of the selected position information, (ii) superimpose an attention area on an area of the complementary image corresponding to a position of the detected obstacle to generate a composite image, and (iii) output the composite image, and
wherein the output composite image is displayed on a display.

11. An image capturing method comprising:
receiving a plurality of images captured by at least three cameras, each of the cameras having a viewing angle that is approximately equal to or larger than 180°, the cameras being integrally fixed to one another to form an image capturing device such that (i) that optical axes of the cameras are substantially parallel to one another and (ii) each of the plurality of images includes occluded areas, each of the occluded areas being an area of an image captured by one of the cameras in which a part of an adjacent one of the cameras is visible and an area behind the part of the adjacent one of the cameras is not visible;
receiving camera parameters stored in advance in a non-transitory memory configured to store in advance, the camera parameters including external parameters regarding physical arrangement of the cameras, internal parameters regarding characteristics of the cameras, and occlusion information that indicates whether or not each pixel of the plurality of images belongs to one of the occluded areas; and calculating three dimensional positions of a plurality of points based on the plurality of images and the camera parameters, and outputting pieces of position information, including the three dimensional positions, about the plurality of points, wherein the plurality of points includes a point, wherein the at least three cameras includes a first camera, a second camera, and a third camera, wherein the plurality of images includes a first image including an image of the point, a second image including an image of the point, and a third image not including an image of the point, wherein the first camera captures the first image, the second camera captures the second image, and the third camera captures the third image, wherein the first image has a first pixel having a first pixel value at first coordinates and the second image has a second pixel having a second pixel value at second coordinates, wherein the three dimensional positions of the plurality of points includes three dimensional coordinates of the point based on the first pixel and the second pixel, wherein the image capturing method further comprises:
  selecting, based on the pieces of position information and the occlusion information, a piece of position information relating to a subject area that does not have an occlusion from among the pieces of position information, and outputting the selected piece of position information as selected position information; and
  generating, based on the plurality of images and the selected position information, a complementary image by complementing an occluded area included in one of the plurality of images and included in the occluded areas, and outputting the complementary image and the selected position information, wherein the complementary image includes a first complementary image of the point, the first complementary image being included in the third image, wherein the first complementary image is provided at a pixel having a third pixel value at third coordinates, wherein the third coordinates are provided based on the three dimensional coordinates of the point and the camera parameters, wherein the third pixel value is provided based on the first pixel value and the second pixel value, wherein the image capturing method further comprises (i) detecting an obstacle on the basis of the selected position information, (ii) superimposing an attention area on an area of the complementary image corresponding to a position of the detected obstacle to generate a composite image, and (iii) outputting the composite image, and wherein the output composite image is displayed on a display.

12. A non-transitory computer readable recording medium recording an image processing program that causes an apparatus including a processor to perform image processing, the image processing program causing the computer to execute steps of:
  receiving a plurality of images captured by at least three cameras, each of the cameras having a viewing angle that is approximately equal to or larger than 180°, the cameras being integrally fixed to one another to form an image capturing device such that (i) that optical axes of the cameras are substantially parallel to one another and (ii) each of the plurality of images includes occluded areas, each of the occluded areas being an area of an image captured by one of the cameras in which a part of an adjacent one of the cameras is visible and an area behind the part of the adjacent one of the cameras is not visible;
  receiving camera parameters stored in advance in a non-transitory memory configured to store in advance, the camera parameters including external parameters regarding physical arrangement of the cameras, internal parameters regarding characteristics of the cameras, and occlusion information that indicates whether or not each pixel of the plurality of images belongs to one of the occluded areas;
  calculating three dimensional positions of a plurality of points based on the plurality of images and the camera parameters, and outputting pieces of position information, including the three dimensional positions, about the plurality of points, wherein the plurality of points includes a point, wherein the at least three cameras includes a first camera, a second camera, and a third camera, wherein the plurality of images includes a first image including an image of the point, a second image including an image of the point, and a third image not including an image of the point, wherein the first camera captures the first image, the second camera captures the second image, and the third camera captures the third image, wherein the first image has a first pixel having a first pixel value at first coordinates and the second image has a second pixel having a second pixel value at second coordinates, wherein the three dimensional positions of the plurality of points includes three dimensional coordinates of the point based on the first pixel and the second pixel, wherein the image processing program further causes the computer to execute steps of:
  selecting, based on the pieces of position information and the occlusion information, a piece of position information relating to a subject area that does not have an occlusion from among the pieces of position information, and outputting the selected piece of position information as selected position information; and
  generating, based on the plurality of images and the selected position information, a complementary image by complementing an occluded area included in one of the plurality of images and included in the occlusion area, and outputting the complementary image and the selected position information, wherein the complementary image includes a first complementary image of the point, the first complementary image being included in the third image, wherein the first complementary image is provided at a pixel having a third pixel value at third coordinates, wherein the third coordinates are provided based on the three dimensional coordinates of the point and the camera parameters, wherein the third pixel value is provided based on the first pixel value and the second pixel value, wherein the image processing program further causes the computer to execute steps of (i) detecting an obstacle on the basis of the selected position information, (ii) superimposing an attention area on an area of the complementary image corresponding to a position of the detected obstacle to generate a composite image, and (iii) outputting the composite image, and wherein the output composite image is displayed on a display.

13. An image capturing apparatus comprising:

at least three cameras configured to capture a plurality of images including a first image captured by a first camera, a second image captured by a second camera, and a third image captured by a third camera, wherein the cameras including the first camera, the second camera, and the third camera, each of the cameras having a viewing angle that is approximately equal to or larger than 180°, the cameras being integrally fixed to one another to form an image capturing device such that (i) that optical axes of the cameras are substantially parallel to one another and (ii) each of the plurality of images includes an occluded area and a subject area capturing a subject, the occluded area and the subject area do not overlap, the occluded area being an area of an image captured by one of the cameras in which a part of an adjacent one of the cameras is visible and an area behind the part of the adjacent one of the cameras is not visible, the first image including a first occluded area included in the occluded area and a first subject area included in the subject area, the second image including a second occluded area included in the occluded area and a second subject area included in the subject area, and the third image including a third occluded area included in the occluded area and a third subject area included in the subject area; and a processor configured to obtain camera parameters including position information about the cameras, focal lengths of the cameras, and occlusion information that indicates whether or not each pixel of the plurality of images belongs to the occluded area, wherein the processor is further configured to generate selected pieces of position information on the basis of the images and the camera parameters, the selected pieces of position information each including (i) three-dimensional position information including a first three-dimensional position information and (ii) pixel pair information including a first pixel pair information indicating a first position of a first pixel included in the first subject area and a second position of a second pixel included in the second subject area, the first three-dimensional position information indicating a first three-dimensional position corresponding to the first position and the second position, wherein the processor is further configured to determine (i) pixel values of pixels included in the occluded area using the selected pieces of position information and (ii) a third position of a third pixel included in the third occluded area, wherein the first image includes an image of a point on a subject at the first pixel having first coordinates, wherein the second image incudes an image of the point at the second pixel, the second pixel having second coordinates, wherein the third image does not include an image of the point, wherein three-dimensional position information of the point includes three dimensional coordinates of the point based on the first pixel and the second pixel, wherein a complementary image of the point is included in the third image, wherein the complementary image is provided at a pixel having a third pixel value at third coordinates, wherein the third coordinates are provided based on the three dimensional coordinates of the point and the camera parameters, wherein the third pixel value is provided based on the first pixel value and the second pixel value, wherein the processor is further configured to (i) detect an obstacle on the basis of the selected position information, (ii) superimpose an attention area on an area of the complementary image corresponding to a position of the detected obstacle to generate a composite image, and (iii) output the composite image, and wherein the output composite image is displayed on a display.

* * * * *